United States Patent
Somech et al.

(10) Patent No.: US 11,100,438 B2
(45) Date of Patent: Aug. 24, 2021

(54) PROJECT ENTITY EXTRACTION WITH EFFICIENT SEARCH AND PROCESSING OF PROJECTS

(71) Applicant: Microsoft Technology Licensing, LLC, Redmond, WA (US)

(72) Inventors: Haim Somech, Herzliya (IL); Ido Priness, Herzliya (IL); Dikla Dotan-Cohen, Herzliya (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 278 days.

(21) Appl. No.: 15/299,787

(22) Filed: Oct. 21, 2016

(65) Prior Publication Data
US 2018/0114177 A1    Apr. 26, 2018

(51) Int. Cl.
| | |
|---|---|
| G06Q 10/06 | (2012.01) |
| G06F 16/28 | (2019.01) |
| G06F 16/2457 | (2019.01) |
| G06F 16/95 | (2019.01) |
| H04L 12/911 | (2013.01) |
| H04L 29/08 | (2006.01) |

(52) U.S. Cl.
CPC ........ *G06Q 10/063118* (2013.01); *G06F 16/24575* (2019.01); *G06F 16/285* (2019.01); *G06F 16/95* (2019.01); *G06Q 10/06* (2013.01); *G06Q 10/06311* (2013.01); *H04L 47/826* (2013.01); *H04L 67/22* (2013.01)

(58) Field of Classification Search
CPC .......... G06Q 10/063118; G06Q 10/06; G06Q 10/06311; G06F 17/30861; G06F 17/30528; G06F 17/30598; H04L 47/826; H04L 67/22

USPC ........................................... 707/758
See application file for complete search history.

(56) References Cited

U.S. PATENT DOCUMENTS

| | | |
|---|---|---|
| 6,754,874 B1 | 6/2004 | Richman |
| 8,140,953 B1 | 3/2012 | Weaver |
| (Continued) | | |

FOREIGN PATENT DOCUMENTS

WO    2018075372 A1    4/2018

OTHER PUBLICATIONS

Trattner, et al., "Evaluating Tag-Based Information Access in Image Collections", In Proceedings of the 23rd ACM conference on Hypertext and social media, Jun. 25, 2012, pp. 113-122.

(Continued)

*Primary Examiner* — Pierre M Vital
*Assistant Examiner* — Alicia M Antoine

(57) ABSTRACT

Systems and methods are provided for associating project entities with projects. In various implementations, user activity data is monitored based on sensor data from at least one user device associated with a user. From the monitored user activity data, entity features are determined of project entities corresponding to the user activity data. Time slots are extracted from the project entities. The time slots are clustered based the entity features of ones of the project entities corresponding to the time slots. The project entities are grouped into projects based on the clustered time slots. Project tags corresponding to the projects are applied to the project entities based on the grouping of the project entities. Content is personalized to the user based on the project tags applied to the project entities.

20 Claims, 6 Drawing Sheets

(56) References Cited

U.S. PATENT DOCUMENTS

| | | |
|---|---|---|
| 8,375,034 B2 | 2/2013 | Norton et al. |
| 8,914,368 B2 | 12/2014 | Badenes et al. |
| 8,935,254 B2 | 1/2015 | Hartman |
| 10,572,858 B2 | 2/2020 | Nelson et al. |
| 2005/0004825 A1 | 1/2005 | Ehrler et al. |
| 2005/0108396 A1 | 5/2005 | Bittner |
| 2005/0138031 A1 | 6/2005 | Wefers |
| 2006/0036696 A1 | 2/2006 | Maresh |
| 2006/0064434 A1 | 3/2006 | Gilbert et al. |
| 2007/0067196 A1 | 3/2007 | Usui |
| 2007/0129976 A1* | 6/2007 | Hochberg ............. G06Q 10/06 705/7.12 |
| 2007/0192402 A1 | 8/2007 | Dean et al. |
| 2008/0040126 A1 | 2/2008 | Estrada et al. |
| 2009/0204470 A1 | 8/2009 | Weyl et al. |
| 2009/0235167 A1 | 9/2009 | Boyer et al. |
| 2009/0259718 A1 | 10/2009 | O'Sullivan et al. |
| 2010/0042600 A1 | 2/2010 | Orr et al. |
| 2010/0134281 A1 | 6/2010 | Duffy et al. |
| 2011/0010280 A1* | 1/2011 | Hiscock ............. G06Q 10/109 705/32 |
| 2012/0239451 A1* | 9/2012 | Caligor ............. G06Q 10/00 705/7.21 |
| 2013/0006887 A1 | 1/2013 | Balko |
| 2013/0036117 A1* | 2/2013 | Fisher ............. G06F 16/487 707/736 |
| 2013/0218888 A1* | 8/2013 | Seligmann ............. G06Q 50/01 707/736 |
| 2013/0311545 A1 | 11/2013 | Wright et al. |
| 2014/0058801 A1 | 2/2014 | Deodhar et al. |
| 2014/0074999 A1 | 3/2014 | Khalsa et al. |
| 2014/0096249 A1* | 4/2014 | Dupont ............. G06F 21/00 726/23 |
| 2014/0244329 A1 | 8/2014 | Urban |
| 2014/0310132 A1* | 10/2014 | Culver ............. G06F 17/5004 705/26.81 |
| 2015/0100582 A1* | 4/2015 | Xi ............. G06F 16/7867 707/738 |
| 2015/0112749 A1* | 4/2015 | Erdal ............. G06F 3/04842 705/7.19 |
| 2015/0127403 A1 | 5/2015 | Petty |
| 2015/0128249 A1 | 5/2015 | Alexandrian et al. |
| 2015/0134425 A1 | 5/2015 | Legris |
| 2015/0205782 A1* | 7/2015 | Subramanya ........ G06Q 10/107 704/9 |
| 2016/0323223 A1 | 11/2016 | Davis et al. |
| 2016/0373539 A1* | 12/2016 | Guo ............. G06Q 10/10 |
| 2017/0124157 A1 | 5/2017 | Keohane et al. |
| 2018/0181901 A1 | 6/2018 | Babcock et al. |
| 2019/0340554 A1 | 11/2019 | Dotan-Cohen et al. |

OTHER PUBLICATIONS

Abel, Fabian, "Contextualization, User Modeling and Personalization in the Social Web", In Dissertation of University Hannover, Dec. 10, 2015, 192 pages.

Dredze, et al., "Intelligent Email: Aiding Users with AI", In Proceedings of the Twenty-Third AAAI Conference on Artificial Intelligence, Jul. 13, 2008, pp. 1524-1527.

"Asana Guide—Permissions", Published on: Oct. 29, 2015, Available at: https://asana.com/guide/help/fundamentals/permissions.

Farrell, et al., "Fringe Contacts: People-Tagging for the Enterprise", In Proceedings of the WWW Collaborative Web Tagging Workshop, May, 2006, 6 pages.

"Project Management", Published on: Mar. 18, 2015, Available at: https://www.insightly.com/features/project-management/.

Ali, et al., "Sensors and Mobile Phones: Evolution and State-of-the-Art", In Pakistan Journal of Science, vol. 66, Issue 4, 2014, pp. 386-400.

"International Search Report and Written Opinion Issued in PCT Application No. PCT/US2017/056701", dated Jan. 3, 2018, 12 Pages.

"International Search Report and Written Opinion Issued in PCT Application No. PCT/US19/029757", dated Aug. 9, 2019, 11 Pages.

"Non Final Office Action Issued in U.S. Appl. No. 15/973,375", dated Mar. 19, 2020, 44 Pages.

"Final Office Action Issued in U.S. Appl. No. 15/973,375", dated Aug. 6, 2020, 43 Pages.

"Non Final Office Action Issued in U.S. Appl. No. 15/973,375", dated Jan. 8, 2021, 41 Pages.

* cited by examiner

PROJECT ENTITY EXTRACTION WITH EFFICIENT SEARCH AND PROCESSING OF PROJECTS

BACKGROUND

Users of computer devices are often involved in many different projects, whether they be personal projects or work projects. Any number of entities may be utilized to facilitate a particular project including e-mails, files, contacts, and the like. In order to track projects, users may perform some rudimentary grouping of project files, such as by arranging e-mails into folders by project. However, a particular file may be relevant to many different projects. As such, a user must look through many different folders to find all relevant files for a particular project. Additionally, the relevance of these files to various projects can change overtime, such that these folders can quickly become stale and lose meaning. Further, many types of information relevant to projects are not captured by these files, and are therefore unknown to the user. Examples include temporal and location aspects, contacts, applications, and user events (e.g., sending an instant messages, opening a file, etc.). Thus, this information becomes lost and cannot be leveraged.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present disclosure relate to systems and methods for associating project entities with one or more projects utilizing patterns identified from user activity data. In some respects, project entities are identified from user activity data and can encompass a diverse assortment of data including files, documents, emails, events, calendar events, meetings, contacts, users, word processing documents, image documents, presentation documents, applications, time slots, text, such as words or phrases, topics, search queries or history, concepts, keywords, pictures, locations, venues, and more.

In some respects, project topics are extracted from the identified project entities, and the project entities are grouped or classified by these project topics. Further, time slots may be extracted from the project entities and clustered into groups. The project entities can be classified by the project topics based on the clustered time slots. By associating the project entities with project topics and time slots, the system can efficiently process queries to project data that have temporal aspects. For example, the system directs analysis to temporally relevant project entities, without having to analyze and parse timestamps and other entity features of each project entity.

In further respects, projects may be modeled using a hierarchical or multilevel topic model. The project resolution, or level of focus for a project in the model, is determined and customized to a user. The project resolution for various projects can vary over time to stay relevant to the user's current needs, reflect additional understanding of the needs of the user, and reflect developments in the project (e.g., a project may expand and split into multiple projects). By customizing the project resolution to users, the system can focus analysis of project data on project entity datasets within the project resolution. Thus, processing power and storage can be preserved.

BRIEF DESCRIPTION OF THE DRAWINGS

The present invention is described in detail below with reference to the attached drawing figures, wherein.

DETAILED DESCRIPTION

Figure 1:
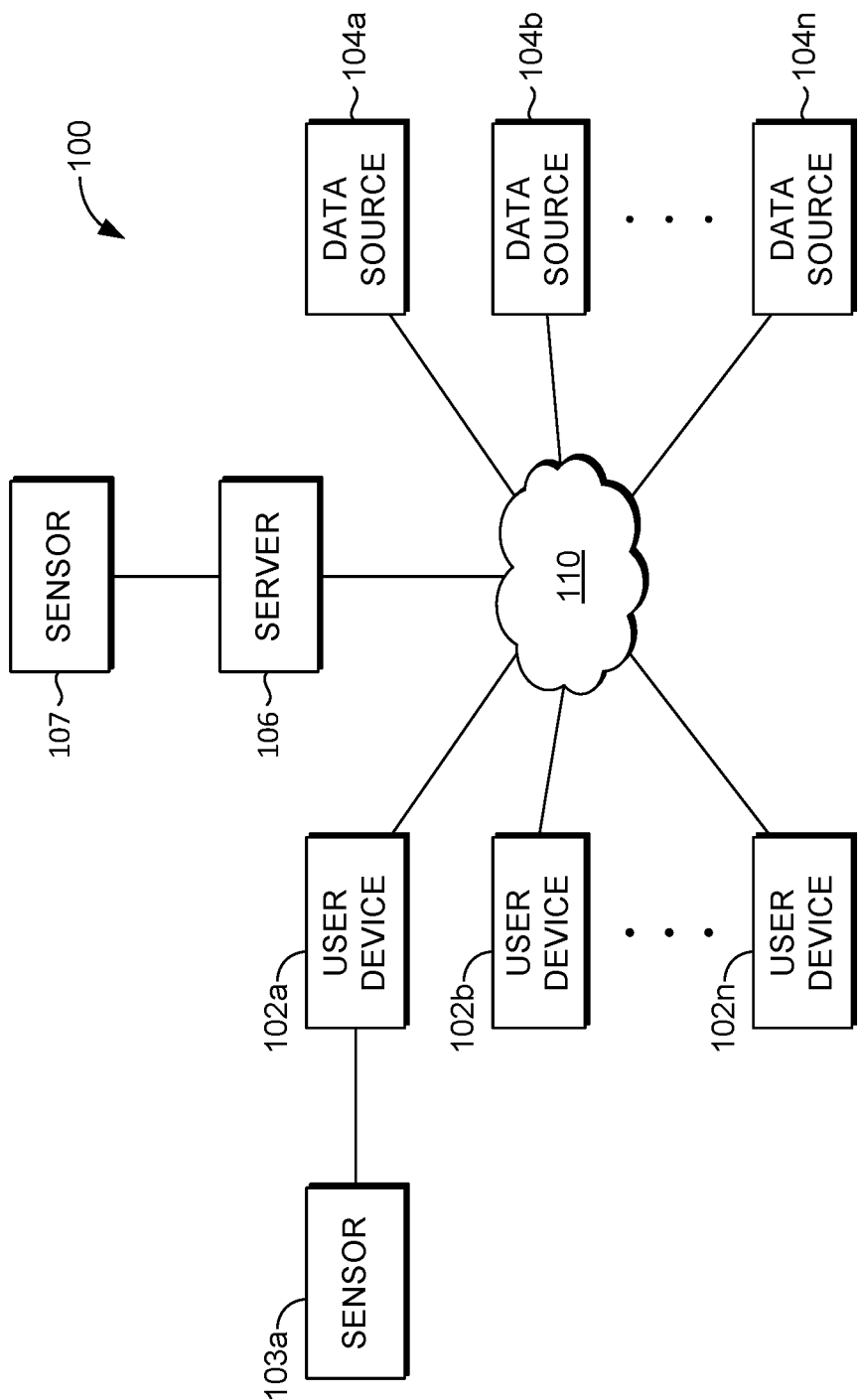
FIG. 1 is a block diagram of an example of a computing environment suitable for use in implementing embodiments of the present invention.

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Each method described herein may comprise a computing process that may be performed using any combination of hardware, firmware, and/or software. For instance, various functions may be carried out by a processor executing instructions stored in memory. The methods may also be embodied as computer-usable instructions stored on computer storage media. The methods may be provided by a standalone application, a service or hosted service (standalone or in combination with another hosted service), or a plug-in to another product, to name a few.

Embodiments of the present disclosure relate to systems and methods for automatically associating project entities with one or more projects utilizing patterns identified from user activity data. In some respects, project entities are identified from user activity data and can encompass a diverse assortment of data including files, documents, emails, events, calendar events, meetings, contacts, users, word processing documents, image documents, presentation documents, applications, time slots, text, such as words or phrases, topics, search queries or history, concepts, keywords, pictures, locations, venues, and more.

As further described herein, various embodiments of the present disclosure improve upon computer search technology and content personalization technology by, for instance capturing aspects of projects as entities that are otherwise unavailable or inaccessible to users and computing systems (e.g., using an event and/or pattern based approach to project entity detection and creation), such as those unknown or unknowable to one or more of the users, which may otherwise be transient in nature, identifying and exposing latent properties or features of project entities and user computing activities, efficiently storing, processing, and accessing project entities, such as through extracting time slots from project entities to define and access projects, adaptive and dynamic importance weighting of project entities with respect to multiple projects, including shifting of project entities between projects, a hierarchical modeling of projects which dynamically adapts to users and projects over time, a dynamic user customized project resolution which directs efficient processing, presentation, storage, and personalization of projects and content based on projects, and automated identification and processing of project data and/or project entities for archiving, which may be based on temporal frequency of user project computing activity.

In some respects, project topics are extracted from the identified project entities, and the project entities are grouped or classified by these project topics. Further, time slots may be extracted from the project entities and clustered into groups. The project entities can be classified by the project topics based on the clustered time slots. By associating the project entities with project topics and time slots, the system can efficiently process queries to project data that have temporal aspects. For example, the system directs analysis to temporally relevant project entities, without having to analyze and parse timestamps and other entity features of each project entity.

In further respects, projects may be modeled using a hierarchical or multilevel topic model. The project resolution, or level of focus for a project in the model, is determined and customized to a user. The project resolution for various projects can vary over time to stay relevant to the user's current needs, reflect additional understanding of the needs of the user, and reflect developments in the project (e.g., a project may expand and split into multiple projects). By customizing the project resolution to users, the system can focus analysis of project data on project entity datasets within the project resolution. Thus, processing power and storage can be preserved.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

Among other components not shown, example operating environment 100 includes a number of user devices, such as user devices 102a and 102b through 102n; a number of data sources, such as data sources 104a and 104b through 104n; server 106; sensors 103a and 107, and network 110. It should be understood that operating environment 100 shown in FIG. 1 is an example of one suitable operating environment. Each of the components shown in FIG. 1 may be implemented via any type of computing device, such as computing device 600, described in connection to FIG. 6, for example. These components may communicate with each other via network 110, which may include, without limitation, one or more local area networks (LANs) and/or wide area networks (WANs). In some implementations, network 110 comprises the Internet and/or a cellular network, amongst any of a variety of possible public and/or private networks.

It should be understood that any number of user devices, servers, and data sources may be employed within operating environment 100 within the scope of the present disclosure. Each may comprise a single device or multiple devices cooperating in a distributed environment. For instance, server 106 maybe provided via multiple devices arranged in a distributed environment that collectively provide the functionality described herein. Additionally, other components not shown may also be included within the distributed environment.

User devices 102a and 102b through 102n may comprise any type of computing device capable of use by a user. For example, in one embodiment, user devices 102a through 102n may be the type of computing device described in relation to FIG. 6 herein. By way of example and not limitation, a user device may be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, a camera, remote control, a bar code scanner, a computerized measuring device, appliance, consumer electronic device, a workstation, or any combination of these delineated devices, or any other suitable device.

User devices 102a and 102b through 102n can be client devices on the client-side of operating environment 100, while server 106 can be on the server-side of operating environment 100. Server 106 can comprise server-side software designed to work in conjunction with client-side software on user devices 102a and 102b through 102n so as to implement any combination of the features and functionalities discussed in the present disclosure. This division of operating environment 100 is provided to illustrate one example of a suitable environment, and there is no requirement for each implementation that any combination of server 106 and user devices 102a and 102b through 102n remain as separate entities.

Data sources 104a and 104b through 104n may comprise data sources and/or data systems, which are configured to make data available to any of the various constituents of operating environment 100, or project management system 200 described in connection to FIG. 2. For instance, in one embodiment, one or more data sources 104a through 104n provide (or make available for accessing) data to user-data collection component 210 of FIG. 2. Data sources 104a and 104b through 104n may be discrete from user devices 102a and 102b through 102n and server 106 or may be incorporated and/or integrated into at least one of those components. In one embodiment, one or more of data sources 104a though 104n comprises one or more sensors, which may be integrated into or associated with one or more of the user device(s) 102a, 102b, or 102n or server 106. Examples of sensed project data made available by data sources 104a though 104n are described further in connection to user-data collection component 210 of FIG. 2.

Figure 2:
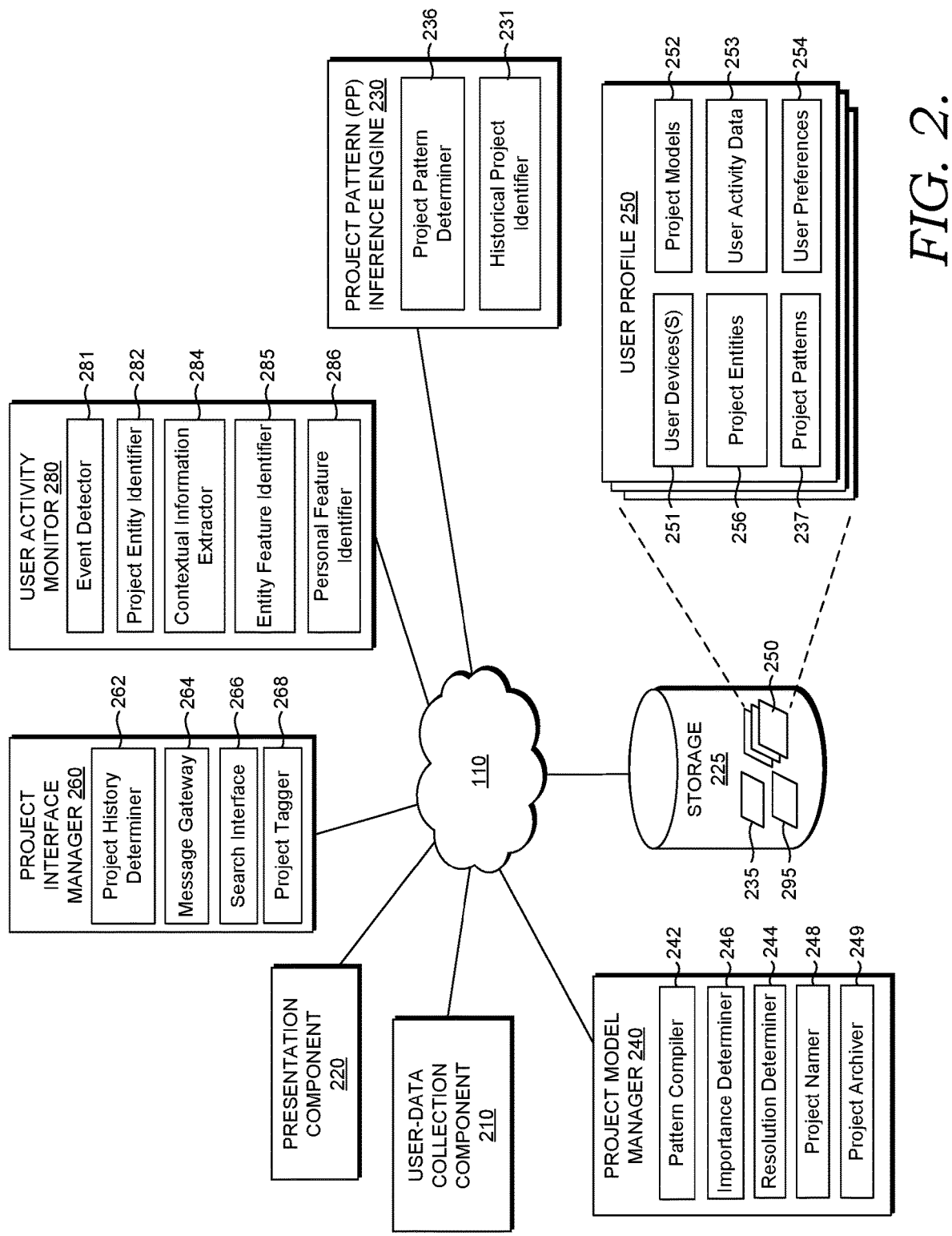
FIG. 2 is a block diagram illustrating an example of a project management system in which some embodiments of the present invention may be employed.

Operating environment 100 can be utilized to implement one or more of the components of project management system 200, described in FIG. 2, including components for collecting user data, inferring project patterns, generating project association models, generating event details or features, and/or presenting project related content to users. Referring now to FIG. 2, with FIG. 1, a block diagram is provided showing aspects of an example computing system architecture suitable for implementing an embodiment of the invention and designated generally as project management system 200. The project management system 200 represents only one example of a suitable computing system architecture. Other arrangements and elements can be used in addition to or instead of those shown, and some elements may be omitted altogether for the sake of clarity. Further, as with operating environment 100, many of the elements described herein are functional entities that may be implemented as discrete or distributed components or in conjunction with other components, and in any suitable combination and location.

Turning now to FIG. 2, a block diagram is provided illustrating an example project management system 200 in which some embodiments of the present disclosure may be employed. Project management system 200 includes network 110, which is described in connection to FIG. 1, and which communicatively couples components of project management system 200, including user-data collection component 210, presentation component 220, storage 225, project pattern inference engine 230, project model manager 240, user profile(s) 250, project interface manager 260, and user activity monitor 280. The components of project management system 200 may be embodied as a set of compiled computer instructions or functions, program modules, computer software services, or an arrangement of processes carried out on one or more computer systems, such as computing device 600 described in connection to FIG. 6, for example.

In one embodiment, the functions performed by components of project management system 200 are associated with one or more personal assistant applications, services, or routines. In particular, such applications, services, or routines may operate on one or more user devices (such as user device 104a), servers (such as server 106), may be distributed across one or more user devices and servers, or be implemented in the cloud. Moreover, in some embodiments these components of project management system 200 may be distributed across a network, including one or more servers (such as server 106) and client devices (such as user device 102a), in the cloud, or may reside on a user device such as user device 102a. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments of the invention described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 200, it is contemplated that in some embodiments functionality of these components can be shared or distributed across other components.

As noted above, it should be understood that project management system 200 shown in FIG. 2 is an example of one system in which embodiments of the present invention may be employed. Each component shown may include one or more computing devices similar to the operating environment 100 described with reference to FIG. 1. Project management system 200 should not be interpreted as having any dependency or requirement related to any single module/component or combination of modules/components illustrated therein. Each may comprise a single device or multiple devices cooperating in a distributed environment. For instance, project management system 200 may comprise multiple devices arranged in a distributed environment that collectively provide any of the various functionality described herein. Additionally, other components not shown may also be included within the environment. It should therefore be understood that project management system 200 and/or its various components may be embodied by any suitable computer arrangement in accordance with various embodiments of the present disclosure.

Project management system 200 generally operates to manage projects with respect to project entities. As briefly mentioned above, each component of the project management system 200, including user-data collection component 210, presentation component 220, project pattern inference engine 230, project model manager 240, user profile 250, project interface manager 260, and user activity monitor 280, and their respective subcomponents, may reside on a computing device (or devices). For example, the components of project management system 200 may reside on the example computing device 600 described below and shown in FIG. 6, or similar devices. Accordingly, each component of the project management system 200 may be implemented using one or more of a memory, a processors or processors, presentation components, input/output (I/O) ports and/or components, radio(s) and a power supply (e.g., as represented by reference numerals 612-624, respectively, in FIG. 6).

As an overview, in some embodiments, user-data collection component 210 facilitates the intake of data and makes the data available to project management system 200 in association with users (i.e., user data). User activity monitor 280 analyzes the user data to identify project entities, extract contextual features associated with user data, such as project entities, and extract personal features of users, such as semantic or characteristic features of users. As used herein, a "project entity" refers to a data object that system 200 associates with one or more projects. Examples include files, documents, emails, events, calendar events, meetings, contacts, users, word processing documents, image documents, presentation documents, applications, time slots, text, such as words or phrases, topics, search queries or history, concepts, keywords, pictures, locations, venues, and more.

Project pattern inference engine uses any combination of the various data provided by user activity monitor 280 to apply semantic understanding to project entities, identify previous projects for project entities, when available, and determine patterns for projects with respect to project entities. Project model manager 240 uses the various pattern information from project pattern inference engine to create and/or update project models, determine the importance of individual projects, determine the resolution or granularity of projects, name projects, and archive projects. Project interface manager 260 facilitates the application of project models, including information derived therefrom, to computer applications, computer services, computer routines, and the like. This may be performed in conjunction with presentation component 220.

User-data collection component 210 is generally responsible for accessing or receiving (and in some cases also identifying) project data from one or more data sources, such as data sources 104a and 104b through 104n of FIG. 1. In some embodiments, user-data collection component 210 may be employed to facilitate the accumulation of user data of a particular user (or in some cases, a plurality of users including crowd-sourced data) for user activity monitor 280 and project pattern inference engine 230.

The data may be received (or accessed), and optionally accumulated, reformatted and/or combined, by user-data collection component 210 and stored in one or more data stores such as storage 225, where it may be made available to other components of project management system 200. For example, the user data may be stored in or associated with user profile 250, as described herein. In various embodiments, any personally identifying data (i.e. user data that specifically identifies particular users) is either not uploaded from the one or more data sources with user data, is not permanently stored, and/or is not made available to user activity monitor 280 and project pattern inference engine 230. Further it is contemplated that any features related to user-data collection and retention be optional and at the discretion of individual users.

User data, which may include project data, may be received from a variety of sources where the data may be available in a variety of formats. For example, in some embodiments, user data received via user-data collection component 210 may be determined via one or more sensors (such as sensors 103a and 107 of FIG. 1), which may be on or associated with one or more user devices (such as user device 102a), servers (such as server 106), and/or other computing devices. As used herein, a sensor may include a function, routine, component, or combination thereof for sensing, detecting, or otherwise obtaining information such as user data from a data source 104a, and may be embodied as hardware, software, or both.

By way of example and not limitation, user data may include data that is sensed or determined from one or more sensors (referred to herein as sensor data), such as location information of mobile device(s), smartphone data (such as phone state, charging data, date/time, or other information derived from a smartphone), user-activity information (for example: app usage; online activity; searches; voice data such as automatic speech recognition; activity logs; communications data including calls, texts, instant messages, and emails; website posts; user interactions with files such as documents, pictures, or videos, which can including opening, closing, editing, and/or deleting those files; other user data associated with communication events; etc.) including user activity that occurs over more than one user device, user history, session logs, application data, contacts data, calendar and schedule data, notification data, social network data, news (including popular or trending items on search engines or social networks), online gaming data, ecommerce activity (including data from online accounts such as Microsoft®, Amazon.com®, Google®, eBay®, PayPal®, video-streaming services, gaming services, or Xbox Live®), user-account(s) data (which may include data from user preferences or settings associated with a personalization-related (e.g., "personal assistant") application or service, home-sensor data, appliance data, global positioning system (GPS) data, vehicle signal data, traffic data, weather data (including forecasts), wearable device data, other user device data (which may include device settings, profiles, network connections such as Wi-Fi network data, or configuration data, data regarding the model number, firmware, or equipment, device pairings, such as where a user has a mobile phone paired with a Bluetooth headset, for example), gyroscope data, accelerometer data, payment or credit card usage data (which may include information from a user's PayPal account), purchase history data (such as information from a user's Amazon.com or eBay account), other sensor data that may be sensed or otherwise detected by a sensor (or other detector) component including data derived from a sensor component associated with the user (including location, motion, orientation, position, user-access, user-activity, network-access, user-device-charging, or other data that is capable of being provided by one or more sensor component), data derived based on other data (for example, location data that can be derived from Wi-Fi, cellular network, or IP address data), and nearly any other source of data that may be sensed or determined as described herein.

In some embodiments, user data may be provided in user-data streams or "user signals," which can be a feed or stream of user data from a data source. For instance, a user signal could be from a smartphone, a home-sensor device, a GPS device (e.g., for location coordinates), a vehicle-sensor device, a wearable device, a user device, a gyroscope sensor, an accelerometer sensor, a calendar service, an email account, a credit card account, or other data sources. In some embodiments, user-data collection component 210 receives or accesses the data continuously, periodically, or as needed.

User data, particularly in the form of event data and/or location data can be received by user-data collection component 210 from one or more sensors and/or computing devices associated with a user. While it is contemplated that the user data is processed, by the sensors or other components not shown, for interpretability by user-data collection component 210, embodiments described herein do not limit the user data to processed data and may include raw data.

User activity monitor 280 is generally responsible for monitoring user data or information that may be used for identifying and/or managing projects on behalf of one or more users. User activity monitor 280 can employ event detector 281, contextual information extractor 284, project entity identifier 282, event feature identifier 285, and personal feature identifier 286 to use this information to identify, determine, generate, collect, and/or maintain project entities, contextual features, and/or personal features, that correspond to user activity associated with one or more users. Any combination of this data may be stored by user activity monitor 280 as user account(s)/activity data in association with users, such as user activity data 253. This includes features (sometimes referred to herein as "variables," such as project features or variables) or other information relating to projects that are identified and/or tracked by user activity monitor 280 with respect to one or more users.

As an overview, event detector 281 detects events, such as events that may be associated with projects or project entities, from user activity. Project entity identifier 282 identifies project entities based on events detected be event detector 281 or otherwise based on identifying entities associated with users (i.e., using non-event based identification). Entity feature identifier determines features of project entities, such as contextual features of particular project entities and personal feature identifier 286 identifies personal features of users. Any of these various components can employ contextual information extracted from user data, project entities, and/or detected events, by contextual information extractor 284.

Embodiments of user activity monitor 280 may determine, from the monitored user data, user activity associated with a particular user. As described previously, the user activity information determined by user activity monitor 280 may include user activity information from multiple user devices associated with the user and/or from cloud-based services associated with the user (such as email, calendars, social-media, or similar information sources. User activity monitor 280 may determine current or near-real-time user activity information and may also determine historical user activity information, in some embodiments, which may be determined based on gathering observations of user activity over time, accessing user logs of past activity (such as browsing history, for example), which may be stored in user activity data 253 in a user profile 250. Further, in some embodiments, user activity monitor 280 may determine user activity (which may include historical activity) from other similar users (i.e., crowdsourcing), as described previously. For example, user data from other users co-located with the user during an event may be analyzed to determine entity features.

In some embodiments, information determined by user activity monitor 280 may be provided to project pattern inference engine 230 including information regarding project entities, context features of those project entities, and historical features (historical observations, which may be provided from records in user profile 250).

As indicated above, in some embodiments, the user data and/or information about user activity determined from user activity monitor 280, including project-event related information, is stored in a user profile, such as user profile 250. This can include project entities 256 identified by project entity identifier 282 and/or user activity data 253 extracted by event feature identifier 285, personal feature identifier 286, event detector 281, and/or contextual information extractor 284.

In an embodiment, user activity monitor 280 comprises one or more applications or services that analyze information detected via one or more user devices used by the user and/or cloud-based services associated with the user, to determine project-related activity information and related contextual information. Information about user devices associated with a user may be determined from the user data made available via user-data collection component 210, and may be provided to user activity monitor 280, project pattern inference engine 230, or other components of project management system 200. More specifically, in some implementations of user activity monitor 280, a user device may be identified by detecting and analyzing characteristics of the user device, such as device hardware, software such as operating system (OS), network-related characteristics, user accounts accessed via the device, and similar characteristics. For example, information about a user device may be determined using functionality of many operating systems to provide information about the hardware, OS version, network connection information, installed application, or the like.

User activity monitor 280 may, at least partially, operate to detect user profile activity that is related to events associated with one or more users. Some embodiments of user activity monitor 280, or its subcomponents, may determine a device name or identification (device ID) for each device associated with a user profile. This information about the identified user devices associated with a user profile may be stored in a user profile associated with the user profile, such as in user devices 251 of user profile 250. In an embodiment, the user devices may be polled, interrogated, or otherwise analyzed to determine information about the devices. This information may be used for determining a label or identification of the device (e.g. a device id) so that the user profile interaction with device may be recognized from user profile data by user activity monitor 280. In some embodiments, user profiles may declare or register a device, such as by logging into an account via the device, installing an application on the device, connecting to an online service that interrogates the device, or otherwise providing information about the device to an application or service. In some embodiments devices that sign into an account associated with the user profile, such as a Microsoft® account or Net Passport, email account, social network, or the like, are identified and determined to be associated with the user profile.

In some embodiments, user activity monitor 280, one or more of its subcomponents, or other components of project management system 200, such as project model manager 240, or project pattern inference engine 230, may determine interpretive data from received user data. Interpretive data corresponds to data utilized by the components of project management system 200 or subcomponents of user activity monitor 280 to interpret user data. For example, interpretive data can be used to provide other context to raw user data, which can support determinations or inferences made by the components or subcomponents (e.g., to infer user activity, events, contextual or personal features, and the like). Moreover, it is contemplated that embodiments of user activity monitor 280, its subcomponents, and other components of project management system 200 may use user data and/or user data in combination with interpretive data for carrying out the objectives of the subcomponents described herein. Additionally, although several examples of how user activity monitor 280 and its subcomponents may identify user profile activity information are described herein, many variations of user profile activity identification and user profile activity monitoring are possible in various embodiments of the disclosure.

Contextual information extractor 284, in general, is responsible for determining contextual information related to the user profile activity (detected by user activity monitor 280), such as context, features or variables associated with project entities and/or events, related information, other user-related activity, and further responsible for associating the determined contextual information with the related events and/or project entities. In some embodiments, contextual information extractor 284 may associate the determined contextual information with a related event or entity and may also log the contextual information with the associated event or entity. Alternatively, the association or logging may be carried out by another service. For example, some embodiments of contextual information extractor 284 provide the determined contextual information to entity feature identifier 285, which determines entity features for entities, and personal feature identifier 286, which determines user personal features for the user profile.

Some embodiments of contextual information extractor 284 determines contextual information in relation to project entities (e.g., people or contacts present during a meeting and/or event or invited to a meeting and/or event, such as recipients of a group email related to the meeting or event) or the location or venue wherein the meeting or event took place. By way of example and not limitation, this may include context features such as location data; which may be represented as a location stamp associated with an event; contextual information about the location, such as venue information (e.g., this is the user's office location, home location, conference room, library, school, restaurant, move theater, etc.) time, day, and/or date, which may be represented as a timestamp associated with the event and which, in some embodiments, may include yellow pages identifier (YPID) information; duration of the event, which may be different than a scheduled duration (i.e., the project was longer or shorter than scheduled); other user projects or activities preceding and/or following the event, other information about the event such as project entities associated with the event (e.g. venues, people, objects, etc. which may be invited, in attendance, involved in planning, or otherwise involved), information detected by sensor(s) on user devices associated with the user that is concurrent or substantially concurrent to the event (e.g. location, motion information, online activity, user-device interactions, or physiological information detected on a fitness tracking user device), or any other information related to the event that is detectable that may be used for determining patterns user-related activity associated with projects related to the user.

In embodiments using contextual information related to user devices, a user device may be identified by detecting and analyzing characteristics of the user device, such as device hardware, software such as operating system (OS), network-related characteristics, user accounts accessed via the device (e.g., online calendars), and similar characteristics. For example, as described previously, information about a user device may be determined using functionality of many operating systems to provide information about the hardware, OS version, network connection information, installed application, or the like. In some embodiments, a device name or identification (device ID) may be determined for each device associated with a user profile. This information about the identified user devices associated with a user profile may be stored in a user profile associated with the user profile, such as in user devices 251 of user profile 250. In an embodiment, the user devices may be polled, interrogated, or otherwise analyzed to determine contextual information about the devices. This information may be used for determining a label or identification of the device (e.g. a Device ID, as described previously,) so that user profile activity on one user device may be recognized and distinguished from user profile activity on another user device. Further, as described previously, in some embodiments, user profiles may declare or register a user device, such as by logging into an account via the device, installing an application on the device, connecting to an online service that interrogates the device or otherwise providing information about the device to an application or service. In some embodiments devices that sign into an account associated with the user, such as a Microsoft® account or Net Passport, email account, social network, or the like, are identified and determined to be associated with the user.

In some implementations, contextual information extractor 284 may receive user data from user-data collection component 210, parse the data, in some instances, and identify and extract context features or variables (which may also be carried out by entity feature identifier 285 and personal feature identifier 286). Context variables may be stored as a related set of contextual information associated with an event and/or project entity, and may be stored in a user profile such as in user activity data 253.

Event detector 281, in general, is responsible for determining (or identifying) an event has occurred. As used herein, an event corresponds to one or more predefined user activities detectable via one or more computing devices. As will later be described in additional detail, embodiments of event detector 281 may be used by project entity identifier 282 to generate or identify project entities, by entity feature identifier 285 to extract contextual features of entities, and/or by personal feature identifier 286 to generate or identify personal features of the user.

Some embodiments of event detector 281 may monitor user data for project-related features or variables corresponding to user activity such as communications received (e.g., project requests or calendar-related communications), indications of applications launched or accessed, files accessed, modified, copied, etc., websites navigated to, online content downloaded and rendered or played, user location or change of location (e.g. user is located in or has changed locations to a conference room) or similar user activities.

Additionally, some embodiments of event detector 281 use contextual information extractor 284 to extract from the user data information about events, which may include current activity, historical activity, and/or related information such as contextual information. (Alternatively or in addition, in some embodiments event detector 281 uses contextual information extractor 284 to determine and extract contextual information that is related to one or more project entities.

Examples of project-related activity information that can be extracted by contextual information extractor 284 and used by components of user activity monitor 280, such as event detector 281, referred to herein as project features, may include information describing app usage, online activity, searches, calls, usage duration, application data (e.g., project requests, emails, messages, posts, user profile status, notifications, user interactions with files such as documents, pictures, or videos, which can including opening, closing, editing, and/or deleting those files, etc.), or nearly any other data related to a user that is detectable via one or more user devices or computing devices, including user interactions with the user device, activity related to cloud services associated with the user (e.g., calendar or scheduling services), online account activity (e.g. email and social networks), and social network activity.

Among other components of project management system 200, the extracted event information determined by event detector 281 may be provided to other subcomponents of user activity monitor 280 (e.g., entity feature identifier 285 and personal feature identifier 286), project pattern inference engine 230, project interface manager 260, or other components of project management system 200. Further, the extracted event information may be stored in a user profile associated with the user, such as in user activity data 253 of user profile 250. In some embodiments, event detector 281 or user activity monitor 280 (or its other sub components) performs conflation on the detected project-related information. For example, overlapping information may be merged and duplicated or redundant information eliminated.

In some embodiments, the project-related features may be interpreted to determine an event has occurred. For example, in some embodiments, event detector 281 employs event logic 295, which may include rules, conditions, associations, classification models, or other criteria to identify project-related activity. For example, in one embodiment, event logic 295 may include comparing event criteria with the user data in order to determine that an event has occurred.

In some embodiments, the identification and/or classifying of events can be based on feature-matching or determining similarity in features, which may be carried out using statistical classification processes Thus, event logic 295 may comprise pattern recognition classifier(s), fuzzy logic, neural network, finite state machine, support vector machine, logistic regression, clustering, or machine learning techniques, similar statistical classification processes or, combinations of these to identify events from user data. Accordingly, event logic 295 can take many different forms depending on the mechanism used to identify an event, and may be stored in storage 225. For example, event logic 295 might include training data used to train a neural network that is used to evaluate user data to determine when an event has occurred. Moreover, event logic 295 may specify types of project features or user activity such as specific user device interaction(s), that are associated with an event, accessing a schedule or calendar, accessing materials associated with a project entity (e.g., an agenda or presentation materials), composing or responding to a project request communication, acknowledging a notification, navigating to a website, or launching an app. In some embodiments, a series or sequence of user-related activity may be mapped to an event, such that the event may be detected upon determining that the user data indicates the series or sequence of user-related activity has occurred or been carried out by the user.

In some embodiments, event detector 281 runs on or in association with each user device for a user. Event detector 281 may include functionality that polls or analyzes aspects of the user device, which may include online- or cloud-services accessible via the user device, to determine project-related features, such as sensor output, applications running (and in some instances the content of the applications), network communications, online/cloud activity related to the user, and/or other user actions detectable via the user device including sequences of actions.

Project entity identifier 282 is generally operable to identify any of the various project entities described herein with respect to one or more users. These identified project entities may be stored in association with one or more users, such as in project entities 256 of user profile 250. Project entity identifier 282 may identify project entities using any suitable means. In some cases, project entity identifier 282 identifies one or more project entities as an event, such as an event detected by event detector 281. As one example, the event could be a meeting event, an event capturing the user working on a project (e.g., using an application), and more. To this effect, an event may be an inferred project entity, where the system generates the project entity based on inferences derived from user data.

In some cases, project entity identifier 282 identifies an event as a project entity based on determining the event occurred, which may be based on a confidence score or other metric evaluating whether the event occurred. In other cases, project entities can be explicit project entities, which are explicit in user data. Example of explicit project entities include files, emails, calendar items, such as meetings, contact entries, and the like. One or more of these project entities may be correspond to a data object having content explicitly defined or definable by one or more users (e.g., the message body of an email, start and end times of a meeting, etc.).

In some cases, project entity identifier 282 may identify on or more project entities based on one or more events detected by event detector 281. For example, project entity identifier 282 can identify project entities from contextual information or features associated with one or more events. For example, contextual information associated with a meeting event may comprise variable defining extractable project entities such as emails accessed during the meeting, location of the meeting or of the user during the meeting, photos taken during a meeting, users or contacts attending or invited to the meeting, files accessed or created during the meeting, search queries provided during the meeting such as file searches performed during the meeting or web searches performed during the meeting, and the like.

It is noted, project entity identifier 282 need to identify project entities in association with events. For example, project entity identifier 282 could identify and extract project entities (e.g., explicit project entities) directly from user data. This extraction could be defined by any number of extraction rules, which may define data object types (e.g., calendar items, emails, attachments, etc.), locations, associated applications, and the like for project entities. In some implementations, any combination of this information is captured by metadata or content of a data object and project entity identifier 282 analyzes the metadata or content to determine whether to identify the data object as a project entity.

In various implementations, project entity identifier 282 identifies project entities in association with an email applications, such as based on being generated or accessed by an email application or in association with an email application, based on being referenced by or to an email application, and/or based on being used by or in association with an email application. For example, project entity identifier 282 can identify emails and/or meeting invites that are sent or received using the enterprise application, attachments to emails or meetings, as well as meetings themselves as project entities. Other project entities include contacts from the email application and/or from a global contacts list associated with users, which may include a contacts list tracked across user devices and/or integrated into operating system software.

Events are examples of project entities that can be generated by project management system 200. As another example, project entity identifier 282 can generate a time slot as a project entity for projects of users. As used herein, a "time slot" can refer to a data object representing a period of time in which one or more activities can be performed by one or more users on one or more computing devices for one or more projects. In some cases, project entity identifier 282 is configured to generate time slots such that the set of time slots used by system 200 are non-overlapping.

In some implementations, one or more of the time slots are generated from calendar and/or meeting data associated with one or more users. For example, the time slots could be extracted from the email application described above, or a more global calendaring and scheduling service. A time slot could be defined by a start time and an end time for a meeting, as one example. However, project entity identifier 282 could otherwise base generation of a time slot on a meeting, such as by defining a start time of a time slot as an arrival time of a user to a meeting and/or an end time of the time slot as a departure time of the user from the meeting.

It should be appreciated that the meeting may optionally correspond to an event and/or a calendar item associated with the user. Features of the project entity, such as start time and end time can be identified and/or assigned by entity feature identifier 285, which is further described below.

Thus, in some embodiments, project entity identifier 282 generates one or more of the time slots by detecting one or more events corresponding to user activity on one or more computing devices in association with a period of time. The period of time used for a time slot could correspond to the period of time over which the user activity occurred, as an example. As another example, the user activity could be inferred and the time slot could be determined based on analyzing patterns formed by previous time stamped events corresponding to the user activity. In some cases, the period of time is determined based on entity features of one or more project entities, or otherwise extracted in association with a project entity. As an example, the period of time could be determined based on analyzing content and/or metadata of a data object corresponding to a project entity. This could include data object edit data (e.g., last date edited, accessed, date created, etc.). Another example includes email sending or receiving data (e.g., time sent, time received, and the like). In various implementations, the period of time could be determined from one or more time stamps associated with or assigned to events and/or project entities.

Other examples of project entities that can be generated by project management system 200 include text entities, topic entities, concept entities, and keyword entities. As used herein, a text entity can refer to a project entity that represents text, such as words, phrases, and the like. In some implementations, one or more of these project entities are generated by project pattern inference engine 230, and therefore these forms of entities are later described in further detail with respect to project pattern inference engine 230.

Entity feature identifier 285 is generally responsible for identifying and optionally determining entity or project features (or variables) associated with the entities that may be used for identifying patterns corresponding to user projects. As indicated above, entity features may be determined from information about an event and/or from related contextual information associated with the project entity. In some embodiments, entity feature identifier 285 receives user-project or related information (e.g., contextual information) from user activity monitor 280 (or its subcomponents), and analyzes the received information to extract or otherwise determine a set of zero or more features associated with a project entity. The event features may be stored in user activity data 253 and/or made available to project pattern inference engine 230 for determining project patterns based on the determined features. For example, common features for different project entities can be used to establish a project pattern.

In addition or instead, entity feature identifier 285 can identify and optionally extract one or more project features of a project entity from content of the data object representing or comprising the project entity and/or metadata of the data object. For a file, this could include file edit data (e.g., last date edited, accessed, date created, etc.). Another example includes email sending or receiving data (e.g., times, recipients, senders, and the like).

Entity feature identifier 285 is generally responsible for identifying and optionally determining entity or project features (or variables) associated with the entities that may be used for identifying patterns corresponding to user projects. As indicated above, entity features may be determined from information about an event and/or from related contextual information associated with the project entity. In some embodiments, entity feature identifier 285 receives user-project or related information (e.g., contextual information) from user activity monitor 280 (or its subcomponents), and analyzes the received information to extract or otherwise determine a set of zero or more features associated with a project entity. The event features may be stored in user activity data 253 and/or made available to project pattern inference engine 230 for determining project patterns based on the determined features. For example, common features for different project entities can be used to establish a project pattern.

Personal feature identifier 286 is generally responsible for identifying and optionally determining user features (or variables) associated with the user that may be used for identifying patterns corresponding to user projects. Personal feature identifier 286 may identify user features similar to entity feature identifier 285 (e.g., from events and/or explicit information in user data). However, as opposed to entity features, which characterize or provide semantic information for a particular entity, user features may characterize, describe, or define a particular user.

Examples of personal features include information about user(s) using the device; information identifying a user, such as a login password, biometric data, which may be provided by a fitness tracker or biometric scanner; and/or characteristics of the user(s) who use the device, which may be useful for distinguishing users on devices that are shared by more than one user. Other examples include demographic information, frequented venues or locations, search history, search queries, known interests (e.g., subjects, concepts, topics), organizational title, hierarchy within an organization, and information derived therefrom. For example, one or more of these personal features may be derived from patterns formed by project pattern inference engine 230 and derived from project entities.

As an example, project topics can be extracted from project entities, as will be described in further detail below, and used to associate the user with one or more project topics. When analyzing a particular project entity, the system can leverage previous semantic knowledge of which project topics the user has been active in to determine a probability the project entity corresponds to one or more of the project topics. This could include comparing the particular entity to the project topic(s) or project entities previously associated with project topics. This probability could be used as a feature in any of the various project entity grouping algorithms described below. It should be appreciated that this concept similarly applies to other properties or combination of properties of project entities other than project topics (e.g., similar search queries, locations, venues, etc.).

Examples of entity and/or user or personal features include information extracted from requests or communications (e.g., project entities), such as time/date, scheduled duration, invitees, importance, responses (e.g. acceptance, tentative-acceptance, declines) proposals or suggestions of alternative times/dates/locations/attendees/other entity features, entity subject(s), file attachments or links in entity-related communications, which may include content of the attachments or links, metadata associated with file attachments or links (e.g., author, version number, date, URL or website-related information, etc.); whether the entity is recurring (e.g., a meeting); features from related entities or scheduled entities (where the entity is part of a series, such as recurring meetings or events); location-related features, such as location of an event, location of user device(s) during the event (which may indicate whether a user is present, not present, or attending remotely), venue-related information associated with the location, or other location-related information; time related features, such as time(s) of day(s), day of week or month the event, or the duration of the event, or related duration information such as how long the user used an application associated with the event or how long a user traveled to attend the event; user device-related features (which in some embodiments may be used for identifying user attendance (physical or remote), participation, and/or involvement at events), such as device type (e.g. desktop, tablet, mobile phone, fitness tracker, heart rate monitor, etc.) hardware properties or profiles, OS or firmware properties, device IDs or model numbers, network-related information (e.g. mac address, network name, IP address, domain, work group, information about other devices detected on the local network, router information, proxy or VPN information, other network connection information, etc.), position/motion/orientation related information about the user device, power information such as battery level, user-access/touch information; usage related features, such as file(s) accessed, app usage (which may also include application data, in-app usage, concurrently running applications), network usage information, online activity (e.g., subject related searches, browsed websites, social networking activity related to the entity, communications sent or received including social media posts, user account(s) accessed or otherwise used, (such as device account(s), OS level account(s), or online/cloud-services related account(s) activity, such as Microsoft® account or Net Passport, online storage account(s), email, calendar, or social networking accounts, etc.), features that may be detected concurrent with the event or near the time or the event, or any other features that may be detected or sensed and used for determining a pattern of project-related activity for the user. In some embodiments, event logic 295 (described in connection to event detector 281) may be utilized to identify specific features from project-related information.

Continuing with system 200 of FIG. 2, project pattern inference engine 230 is generally responsible for determining project patterns based on the various information determined from user activity monitor 280. For example, in some cases, semantic information analyzer 233 users contextual information generated by user activity monitor 280 as context-related entity features, such as for determining semantic information in events to determine a project pattern. Contextual information also may be determined from the user data of one or more users, in some embodiments, which may be provided by user-data collection component 210 in lieu of or in addition to user project information for the particular user. In an embodiment, the contextual information is stored with the corresponding entity in user activity data 253.

At a high level, project pattern inference engine 230 may receive project entity data, at least some of which is provided using user activity monitor 280, or its subcomponents, user-data collection component 210 from client-side applications or services associated with user activity monitor 280, and/or user project or event history which may be stored in user profile 250. One or more inference algorithms may be applied to the entity information to determine project patterns from the project entities identified using project entity identifier 282. For example, patterns may be determined based on similar entity features between project entities or associated personal features, which may be referred to as "in-common features" of entity-related information.

The inferred event pattern information may be provided to project model manager 240 and/or used to generate a project pattern based prediction regarding one or more projects inferred from the project entities. In some embodiments, a corresponding confidence is also determined for the patterns (or predictions based on the patterns), as described herein.

Project pattern inference engine 230, or its subcomponents, may operate to analyze project entities, including entity features and optionally personal features, provided by user activity monitor 280. In some cases, personal features could correspond to, for example, historical projects previous identified and/or analyzed with respect to project pattern inference engine 230 and/or explicitly acknowledged or otherwise specified by the user.

As shown in example system 200, project pattern inference engine 230 comprises historical project identifier 231, semantic information analyzer 233, and project pattern determiner 236. Historical project identifier 231 is configured to identify a plurality of prior or current projects for a user, which may be considered for determining a project pattern. For example, personal feature identifier 286 may utilize historical project identifier to identify project entities and/or projects from which to extractor personal features.

Project pattern determiner 236 is generally responsible for analyzing project entities with respect to one or more projects based on similarities in project entity information, such as entity features identified by entity feature identifier 285 and optionally personal features identified by personal feature identifier 286. This can include project pattern determiner 236 (or project pattern inference engine 230) determining potential projects the user may be associated with by extracting project topics from the project entity information and analyzing patterns formed by project entity information in order to associate project entities with one or more project topics.

In some embodiments, project pattern determiner 236 determines project patterns using pattern inferences logic 235. Pattern inferences logic 235 may include rules, associations, conditions, prediction and/or classification models, or pattern inference algorithms. The pattern inferences logic 235 can take many different forms depending on the particular project pattern or the mechanism used to identify a project pattern, or identify feature similarity among observed project entity data to determine the pattern. For example, some embodiments of pattern inferences logic 235 may employ machine learning mechanisms to determine feature similarity, or other statistical measures to determine the event data belonging to a set of "example user activity" that support the determined project pattern. In some embodiments, the project pattern(s) determined by project pattern determiner 236 may be stored as project patterns 237 and/or provided to project model manager 240, which may determine one or more inferred project model(s) 252 from the pattern(s).

Some embodiments of project pattern determiner 236 determine a pattern for projects (e.g., project topics) where each project has corresponding historical values of tracked project features (variables) that form patterns, and where project pattern determiner 236 may evaluate the distribution of the tracked variables for patterns. These project features and patterns may be utilized as personal features used to analyze new project entities with respect to projects and/or adjust previously determined associations between project entities and projects. These project features and patterns may also be utilized to personalize content to users based on the projects, or otherwise be consumed by the various components of project management system 200.

In some cases, the project features are based on project entities previously associated with the project by project pattern determiner 236. In one instance, a tracked variable is associated with a time slot corresponding to an observed instance of the project. Optionally, the tracked variable could further be based on entity features of one or more entities within the time slot. It will be appreciated that, conceptually, many different types of historical values for tracked project features (variables) may be used. Further, it should be appreciated that the project pattern determiner 236 may determine patterns for projects based on any number of features.

Figure 3:
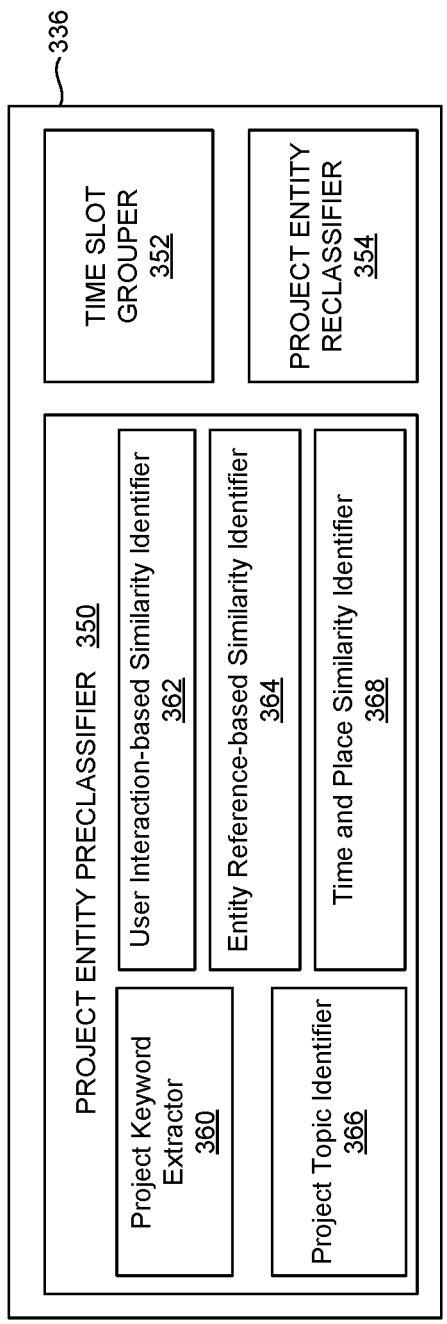
FIG. 3 is a diagram illustrating an example of a project pattern determiner in accordance with embodiments of the present disclosure.

Turning to FIG. 3, a diagram is provided illustrating an example of an implementation of a project pattern determiner, such as project pattern determiner 236 of FIG. 3. Project pattern determiner 336 of FIG. 3 includes project entity preclassifier 350, time slot grouper 352, and project entity reclassifier 354, which may implement pattern inferences logic 235. It should be appreciated that project pattern determiner 336 is one example of project pattern determiner 236 and other implementations and variations are contemplated as being within the scope of the present disclosure.

The example of project pattern determiner 336 comprises a multi-stage classifier in which project entity preclassifier 350 classifies project entities by project topic, time slot grouper groups, or clusters, time slots by project entities associated with the time slots, and project entity reclassifier 354 reclassifies the project entities user the project topics by the grouped time slots.

In the present example, project entity preclassifier 350 is configured to extract project keywords from project entities and group project entities into project topics corresponding to the keywords. Project entity preclassifier 350 includes project keyword extractor 360, user interaction-based similarity identifier 362, entity reference-based similarity identifier 364, and project topic identifier 366, and time and place similarity identifier 368.

Project keyword extractor 360 is configured to extract project keywords from project entities. The keywords can be extracted, for example, from content of project entities, and/or metadata of project entities, which can include data object metadata and/or entity features. In some implementations, this includes extracting keywords from text in the content of the data objects represented by the project entities using text-based extraction techniques. For example, keywords can be extracted from emails (e.g., subject line, message body, attachments, and the like), documents accessed during or in association with meetings, meeting invites or other planning or scheduling messages, and the like. It is noted, any suitable keyword extraction techniques may be employed.

In some implementations, project keyword extractor 360 identifies a set of differentiating keywords from the project entities. This can be accomplished, for example, based on determining the frequency of text, such as terms, in a project entity and/or across the project entities and basing the set of differentiating keywords on the frequency of the text. One suitable approach uses term frequency-inverse document frequency. In some cases, the differentiating keywords are extracted by applying a clustering algorithm to the text and project entities, and each differentiating keyword corresponds to a text cluster. Each text cluster can comprise documents or other project entities corresponding to the text cluster. Document classification algorithms may be utilized in various approaches (e.g., unsupervised document classification).

A source of the text can include, as examples, a title of a project entity, such a title of a file or document, a title of a meeting, and a subject line of an email. Another potential source of the text can include a body of a project entity, such as the body of a meeting, the body of a document, the body of an email, and the like. It should be appreciated that the text can be from metadata of the project entity or content of the project entity. In the context of the aforementioned text, metadata is considered as being distinct from the content of a project entity.

Project topic identifier 366 is configured to identify and/or extract project topics or concepts from the keywords provided by project keyword extractor 360. Any suitable approach to converting keywords to topics may be employed. In some cases, the keywords (e.g., text clusters) are resolved or mapped to a project topic model. The project topic model can, in some implementations, be generated from the project entities, such as by using a topic model generator that may generate at least some topics from the differentiating keywords provided by project keyword extractor 360.

In some implementations, Project topic identifier 366 resolves keywords to project topics using singular value decomposition (SVD) and non-negative matrix factorization (NMF). SVD may be used as one suitable approach to reducing the keywords down to the most relevant keywords. NMF may be used as another suitable approach to reducing the keywords down to the most relevant keywords in addition to or instead of SVD. These approaches may utilize the text clusters from project keyword extractor 360 and also may employ entity features of the project entities associated with the text clusters. For example, a keyword may be mapped to a topic based on similarities defined by the project entities corresponding to the keyword.

In some cases, the topic models used and/or generated by Project topic identifier 366 are hierarchical topic models. Using hierarchical topic models projects and project entities are tracked and analyzed at various resolutions, or granularity. As will later be described in further detail, this can be used to present the projects to users at different resolutions, as well as optionally customizing the resolution to the user and/or allowing the user to select the resolution desired for presentation is various contexts. For example, a project topic could be "Client Relations," and under that project topic could be "customer acquisition" and "customer retention." Under each of those project topics could be project topics for particular clients. It is further noted that the project resolution for various projects can vary over time to stay relevant to the user's current needs, reflect additional understanding of the needs of the user, and reflect developments in the project (e.g., a project may expand and split into multiple projects).

In order to group the project entities into topics based on similarities between the project entities, project entity preclassifier 350 can detect the in-common features between project entities (e.g., from entity features and/or personal features). Project entity preclassifier 350 may determine and/or identify similarities for any type of the various entity features described above. Project entity preclassifier 350 can apply the in-common features as inputs to the machine learning algorithms used by project entity preclassifier 350 for topic grouping and/or generation. For example, project entity preclassifier 350 may generate one or more matrices from the in-common features to use as inputs for project entity clustering algorithms (e.g., document clustering).

To this effect, user interaction-based similarity identifier 362 is configured to identify in-common features corresponding to one or more users (e.g., the user) interacting with a project entity. In particular, user interaction-based similarity identifier 362 may identify each project entity for which user interaction-based similarity identifier 362 can identify or infer an explicit interaction based on detected user activity, such as an event. Examples include detecting user activity corresponding to a user opening a document, attaching a document to an email, drafting an email, working in an application, and the like. User interaction-based similarity identifier 362 can generate one or more matrices of users and/or contacts per project entity from the identified features, which can be input to document clustering algorithms, such as NMF.

Entity reference-based similarity identifier 364 is configured to identify in-common features corresponding to a project entity explicitly referencing one or more project entities. In particular, user interaction-based similarity identifier 362 may identify each project entity for which user interaction-based similarity identifier 362 can identify an explicit reference to another project entity. Examples correspond to documents attached to an email, documents attached to a meeting, invitees or participants of the meeting, applications, locations, or venues mentioned in or linked from emails or meetings, and the like. Entity reference-based similarity identifier 364 can generate one or more matrices of references per project entity from the identified features, which can also be input to the document clustering algorithms, such as NMF.

Thus, in some cases, the in-common features identified by project entity preclassifier 350 can include, for example, in-common participants and/or contacts between project entities. As indicated above, this can include groups of users the system detects as having interacted with a project entity, are referenced in content or metadata of the project entity, or are otherwise detected as being associated with the project entity. These features can leverage the findings that in a project context, users who work on the same project tend to be associated with the same or similar project entities.

Time and place similarity identifier 368 is responsible for identifying in-common time-related features for the clustering algorithms. For example, each project entity may be associated with one or more times, time slots, and/or timestamps (examples have been described above). The project entities can be grouped into topics based on project entity preclassifier 350 determining one or more similarities between these timestamps. For example, the similarity between time-related features may be based on temporal proximity of the time-related features. This may be based on the notion that at least some project entities are more likely to belong to the same project when they are temporally similar. For instance, documents accessed concurrently are more likely to be related to the same project. As another example, emails sent and received within an hour are more likely to be related.

Time and place similarity identifier 364 is also responsible for identifying in-common place-related features for the clustering algorithms. For example, each project entity may be associated with one or more venues, locations and/or GPS coordinates. The similarity between place-related features may be based on location proximity of the place-related features. This may be based on the notion that at least some project entities are more likely to belong to the same project when they are locationally similar. For instance, people may work on projects in particular locations. Thus, documents both associated with the office are more likely to be related to the same project. Further, project entities associated with home might be less likely to be associated with project entities associated with the office. For example, those projects may be associated with personal projects.

Time slot grouper 352 is configured to group time slots, such as the time slot project entities generated by project entity identifier 282. Time slot grouper 352 may group the time slots based on the project entities associated with these time slots. For example, project entities related to a time slot may include project entities used to generate the time slot, project entities associated with time stamps within the time slots, events having time stamps within the time slot, project entities corresponding to detected user activity determined to have occurred within the time slot, and the like. Nearest neighbor techniques may be applied to the clustering using entity features of the project entities in association with particular time slots.

Project entity reclassifier 354 is configured to reclassify the project entities classified by project entity preclassifier 350 based on the clusters of time slots produced by time slot grouper 352. In doing so, project entities may be moved to different topics based on their corresponding time slots. In further respects, project entity reclassifier 354 may base the reclassification on one or more personal features of the user, such as those identified by personal feature identifier 286. These include personal features corresponding to the user's search history, the user's role in an organization, characteristics or semantics derived from previous project analysis, the user's position within an organizational hierarchy, known interests of the user, and the like.

As indicated above, in various implementations, the personal features utilized for reclassifying the project entities can be based on previous engagement of the user with other project entities. For example, in some cases, personal features could correspond to project features. These project features could be used to derive a probability that a project entity corresponds to the project. The probability may be based determining project patterns for project entities that are similar to the project entity. For example, a project pattern for a project may be accessed based on the project pattern being formed by project entities that are the same type of project entity as the project entity (or otherwise identified as similar to the project entity). As an example, the pattern could be formed by meeting type project entities where the project entity corresponds to a meeting. By analyzing the user's historical patterns for a project with respect to a project entity, project entity reclassifier 354 can determine a probability, or confidence, that an unclassified project entity corresponds to the project.

To illustrate the forgoing, for a project topic for drafting a sales agreement, the user may not typically schedule or participate in meetings, resulting in a low probability of a meeting corresponding to the project topic. In contrast for a project topic for drafting a licensing agreement, the user may frequently schedule or participate in meetings, resulting in a high probability of the meeting corresponding to the project topic. It is noted, this approach need not be project specific, and project patterns could be aggregated from different projects, such as by shared characteristics between the projects.

It is noted that for the entity classification and clustering described, project entities need not be limited to single project topics and/or time slots. In particular, associations between project entities and time slots or project topics can be weighted by strength and can vary over time. This may be captured using confidence scores for each project entity. Thus, a single project entity could be strongly associated with multiple project entities, such as may be identified by determining weightings for those project topics exceed a threshold value, although one of those project topics may be identified as the prominent project topic based on the project entity having the highest weighting for that project topic. Theses project topics need not share a parent child relationship in a hierarchical topic model. Further, in some cases, project entity reclassifier reclassifies the project entities by adjusting weightings determined by project entity preclassifier 350.

Using project entity reclassifier, project entities may be shifted to different projects based on associated time slots.

Further, project entities with weightings previously too low to associate with any particular project or project entities not previously analyzed may be associated with one or more projects. This approach may be suitable, for example, for non-textual files, such as audio, video, or picture files, or other project entity types that are sparse or lacking in textual content or metadata. While keyword extraction may be performed on these types of files, it can be inaccurate and processor intensive. By associating these non-textual project entities with timeslots grouped by projects, they can be accurately associated with projects. For example, in some embodiments, the keyword extraction is not performed on these types of project entities.

Thus, in some embodiments, project pattern determiner 236 provides project patterns and associated confidence scores regarding the strength of the project patterns. These project patterns may reflect the likelihood that a user will follow the pattern for future events. More specifically, in some embodiments, a corresponding confidence weight or confidence score may be determined regarding a determined project pattern for a user. The confidence score may be based on the strength of the pattern, which may be determined based on the number of observations (i.e., the number of project entities) used to determine a project pattern, how frequently the user activity is consistent with the project pattern, the age or freshness of the activity observations, the number of similar features, types of features, and/or degree of similarity of the features in common with the activity observations that make up the pattern, or similar measurements.

In some instances, the confidence score may be considered when providing a determined project pattern to project model manager 240. For example, in some embodiments, a minimum confidence score, or weighting, may be needed before using the project pattern to infer a project exists based on the pattern. In one embodiment, a threshold of 0.6 (or just over fifty percent) is utilized such that only project patterns having a 0.6 (or greater) likelihood of predicting user actions with regards to a project may be may be provided. Nevertheless, where confidence scores and thresholds are used, determined patterns of project entities with confidence scores less than the threshold may still be monitored and updated based on additional project entity observations, since the additional observations of may increase the confidence for a particular pattern.

In some approaches, bootstrapping is employed. For example, initially project patterns may not be sufficiently strong due to insufficient data, however, project pattern determiner 236 may make preliminary analysis of project patterns and update those determinations as additional data becomes available to system 200. This additional data may be sufficient to support inferences that projects exist and/or which project entities belong to those projects.

Bootstrapping may be applied, for example, to the hierarchical classification of project topics. Initially, data may be sufficient to infer a project topic applies to the user, but may be insufficient for sub project topics until additional data is received and/or analyzed by system 200 to increase confidence scores for those topics. Additionally, new keywords may introduce new potential project topics into the model. In another approach, several project topics are identified to apply to the user. Similarities are determined between the project topics in order to construct a model. Thus, it should be appreciated that top down or bottom up approaches can be employed.

As mentioned previously, project model manager 240 uses the various project pattern information from project pattern inference engine to create and/or update project models, determine the importance of individual projects, determine the resolution or granularity of projects, name projects, and archive projects. As shown in system 200, project model manager 240 includes pattern compiler 242, importance determiner 246, resolution determiner 244, project namer 248, and project archiver 249.

Pattern compiler 242 may operate to compile one or more project patterns for a user determined by project pattern determiner 236 or project pattern inference engine 230. In particular, according to a compilation of one or more project patterns, a project model may be determined and used to infer project-related aspects for future projects and/or project entities. In some embodiments, pattern compiler 242 provides a project model for projects at the resolution determined by resolution determiner 244 and/or based on the importance of the project determined by importance determiner 246. In some embodiments, pattern compiler 242 also may gather semantic information, features, categories, and any other project related data/information available via project management system 200 for use in the project model.

Importance determiner 246 is operable to determine the importance of projects. For example, importance determiner 246 may assign an importance score to each project topic. The importance score can quantify the importance of the project topic to the user relative to other project topics. As another example, importance determiner 246 could assign the importance score to groups of project topics. This may be suitable where a hierarchical model is employed. For example, an importance score may be generated for the project topic at a resolution selected by and/or inferred for the user (e.g., an importance score for a parent topic may be used for child topics).

In some implementations, importance scores are based on time slots and/or time stamps associated with the projects, and/or the number of project entities within the project. More important projects may be inferred for projects having more project entities. Further, more important project may be inferred for projects associated with more time slots. As another example, more important project may be inferred projects that have project entities associated with more recent time stamps and/or time slots. It should therefore be appreciated that importance scores for projects can change over time as new project entities are received and/or processed by project pattern inference engine 230 and/or based on elapsing time.

Resolution determiner 244 is operable to determine project resolution for users. Project resolution can refer to a level for a project in the hierarchical project model. By personalizing the resolution to users, projects can be analyzed at the appropriate level of detail for that user. Thus, for example, a manger may have a lower resolution on projects than employees working under the manager, in order to capture a broad spectrum. In contrast, the resolution may be higher and more specific for those employees in order to focus the data presented to those users on their tasks.

This can save processing power, bandwidth, and other computing resources. For example, fewer details may be required by the system for tracking project entities and presenting content to a user at a lower resolution. As another example, for content generated using a higher resolution of a project, the analysis of project entities and patterns can be narrowed from lower resolutions to reduce processing demands (e.g., there is less data associated with a child project topic than its parent so less processing is required).

In some cases, the resolution for project may be at a default resolution, as additional project entities are analyzed, the system may automatically adjust the resolution. For example, resolution may be changed based on importance scores for project topics. In one approach, resolution determiner 244 analyzes the importance score for one or more outliers or project topics above a standard deviation or otherwise greater than other projects. Resolution determiner 244 may selection the resolution for various projects based on these outliers. For example, if a project topic has an importance score sufficiently greater than each of its child project topics; resolution determiner 244 may set the resolution to that project topic. In some cases, where a resolution is set to a project topic, project model manager 240 and pattern compiler 242 process the project at that project topic level, such that project models for the lower level project topics are not individually processed and maintained, thereby reducing computing resources. It should be noted that importance scores may still be updated and generated for each project topics, and may be used to adjust the resolution over time. Further in some cases, the user may set the resolution or selectively generate views of the project at other project levels.

In some implementations, resolution determiner 244 determines a current resolution for display, analysis, and/or surfacing of a project, such as using approaches described above. As the current resolution changes over time, resolution determiner 244 may maintain those previously selected and/or determined resolutions for the project. This information can be utilized, for example, to determine the latest current resolution or whether to maintain the current resolution. For example, it may be desirable to account for prior resolution(s) used to present a project to a user in order to ensure stability in the presentation of the project. As another example, by maintaining prior resolutions, the project status over time may be exposed to users based on prior project resolutions. This may include visually depicting the project splitting into multiple projects, and the like.

Project namer 248 may optionally be employed and is generally responsible for naming or labeling projects for users. The names can be presented to the user in association with their corresponding projects to refer to those projects. In other approaches, names may not be required. For example, different projects may be distinguished using a color coding system or other system to visually distinguish projects. In some cases, the names are automatically generated based on the project topics and/or importance scores. In addition or instead, a project name may be based on a resolution of the project for the user (e.g., the project topic at the selected resolution and/or its subtopics).

Project namer 248 can generate project names that are personalized to users. In addition or instead, project namer 248 can use a system wide naming scheme to maintain consistency across users. For example, the same project may have the same name for different users, which could be independent of project resolution. It is contemplated that users could additionally have personalized names for projects, which optionally may be set or modified by individual users.

Project archiver 249 is configured to archive projects over time. For example, old inferred projects may be archived based on their importance scores. A project may be archived based on its importance score falling below a threshold value over time. This could occur, for example, based on the system identifying few project entities for the project over a period of time. It is contemplated that archiving a project may be based on user approval and/or direction to archive. Data for an archived project may be maintained, such as project patterns, inferences, project tags, and the like. However, new project entities may be not compared to an archived project, thereby reducing computing resources utilized to identify projects and/or assign project entities to projects.

Some embodiments of the present disclosure further include using project data elements from other users (i.e., crowdsourcing data) for determining project patterns, project models, and/or relevant supplemental content to build project models. Accordingly, in an embodiment, project models may incorporate compiled prior project patterns, crowdsourced event data, detected existing project, and current user profile activity, among other inferred or gathered data, to construct project models. The generated (or updated) project models may be stored in user profile 250 associated with the user, such as in project models 252.

Returning to FIG. 2, project interface manager 260 is generally responsible for facilitating the consumption of data generated from project patterns and/or project models to consumer applications or services. In some embodiments, project interface manager 260 operates in conjunction with presentation component 220 to provide a user interface for providing and/or interacting with data of an identified project. In doing so, content can be personalized to the user based on projects associated with the user. Presentation component 220 generally operates to render various user interfaces or otherwise provide information generated by project management system 200 and the components thereof in a format that can be displayed on a user device. By way of example, presentation component 220 may render a project management service interface for receiving project settings, which may be stored in user preferences 254. Examples of project settings have been described above and include project resolutions, project names or nicknames, and the like. Presentation component 220 may further render a project informational service for presenting project details provided by project interface manager 260.

Embodiments of project interface manager 260, and/or its subcomponents may run on a single computing device, across multiple devices, or in the cloud. For example, in one embodiment where project interface manager 260 operates in conjunction with features provided by Microsoft® Exchange, project interface manager 260 may reside, at least in part on an Exchange server, which may be embodied as server 106, in FIG. 1. Further, presentation component 220 may at least partially be embodied as user device 102*a*.

Project interface manager 260 includes project history determiner 262, message gateway 264, search interface 266, and project tagger 268. Project tagger 268 is operable to tag project entities with corresponding projects. Tagging a project entity can include storing a project's tag in the project entity in association with the project. This can include a project identifier, a project name (as described above), an importance indicator (e.g., corresponding to the projects importance score), a confidence score for each project (e.g., a level of confidence the project entity corresponds to the project), and/or a project resolution level or project hierarchy indicator. In some cases, project tagger 268 tags projects with a subset of identified projects, such as those having the highest importance scores in conjunction with the importance scores exceeding a threshold value.

Presentation component 220 can utilize the project tags to present the projects to users. For example, a project may be displayed in association with information from its project tag, such as its project name. Further, presentation component 220 may present the project based on its project resolution level and importance level or score.

Project history determiner 262 is operable to provide project summaries, analysis, and efficiency suggestions, which can be presented by presentation component 220. To do so, project pattern inference engine 230 can analyze project features corresponding to project time slots and corresponding project entities. Project history determiner 262 may further surface suggested applications based on project history, such as frequently used applications detected from user activity.

Project history determiner 262 can expose identify the times the user worked on or will work on a project and expose it to the user. This could include generating a summary of projects and time over a user specified time period (e.g., weekly, months, daily, etc.). Project history determiner 262 can employ search interface 266 for project-based queries, which is described below in additional detail. Project history determiner 262 could also process time related queries against projects, such as determining when we a user first worked on a project or surfacing documents based on the projects lifecycle, allowing the user to understand the project lifecycle.

It is noted that project history determiner 262 can be forward looking. For example, project entities may be incorporated into the project history that have not yet occurred or elapsed. Thus, a user may request or otherwise be provided with a summary for a project(s) of an upcoming week, day, or other time period.

Message gateway 264 is operable to act as a gateway to messages and notifications being presented to the user. Message gateway 264 can in some implementations, monitor and analyze incoming messages and notifications and determined whether to permit those communications to be presented on a user device. To do so, message gateway 264 may determine whether a communication corresponds to one or more particular projects. For example, message gateway 264 can determine whether to block or permit one or more communications from being presented based on which projects they correspond to or to which they fail to correspond. To do so, message gateway 264 may analyze a message with respect to known project entities identified for a project, including wither the message corresponds to a contact, includes one or more project keywords or terms, and the like.

In some cases, message gateway 264 blocks or permits the one or more communications (e.g., emails, phone calls, text messages, push notifications) based on determining the user is engaged in the project. For example, identified project relevant communications can be presented and identified non-project relevant communications may be blocked from presentation. Message gateway 264 may determine the user is engaged in the project in various manners. In some cases, message gateway 264 may determine the user is in a meeting corresponding to the project. As another example, message gateway 364 could make such a determination by comparing user activity (e.g., current activity or previous) with respect to project features. This can include determining a probability the user will be or is engaged in the project. For example, detected interactions with applications, contacts, and/or time periods (e.g., day of week, time of day, week of month or year, month of years, etc.) frequently associated with a project can indicate the user is engaged in the project. In addition or instead, the user may explicitly label a meeting or time slot with a project tag message gateway 264 uses to identify project engagement.

Search interface 266 is operable to facilitate processing of searches with respect to projects. For example, search interface 266 can process search queries against project tags. This can allow, for example, a user via presentation component 220 to search for each file related to one or more particular projects, which may optionally specify a particular project entity type for search results. The search results can be presented on a user device associated with the user. In some cases, search interface 266 ranks project entities against search queries. For example, search interface 266 can rank project entities by their confidence scores and/or importance scores. Optionally, search interface 266 processes search quires that specify one or more time periods or ranges to search for project entities. In implementations where time slots are clustered to projects, these queries can efficiently be resolved with low processing requirements.

Search interface 266 can also operate to personalize other types of searches to users. For example, web search, document searches, contact searches, and the like can be personalized based on project data. For example, search entities can be compared to project features and/or entities and the ranking of the search entities can be based on their similarities to the project data. In further respects, these searches could in some cases be performed by a personal assistant running on a user device, such as to interpret a user command or query, or otherwise return results to the user input based on processing the input against project data. As an example, suppose a user provides a voice command "Call John." Assume the user has many contacts named John. Search interface 266 can determine the user is or will be engaged in a project, as described above, and further resolve the command to "John Smith," based on determining that contact corresponds to the project (e.g., that contact may be a project entity associated with the project). Thus, the user needs to specify additional detail about in the command. This can, for example reduce the bandwidth and storage size required to transmit the voice command to the server, as well as avoid follow-up user prompts and/or user commands.

In some embodiments, information from project models for projects may be displayed or made accessible via project interface manager 260 and presentation component 220. A user may be able to access aspects of and view his or her project models. This may provide an opportunity for the user to see patterns and trends that may be reflected in their project models. Further, in some instances, the project models of other user profiles and/or an aggregated project models (which may remove identifying information, in some instances) may also be generated for display. Moreover, some embodiments of the invention may construct a complementary or shadow calendar for one or more users, based on the associations between project and time slots, which may be displayed to one or more users.

Figure 4:
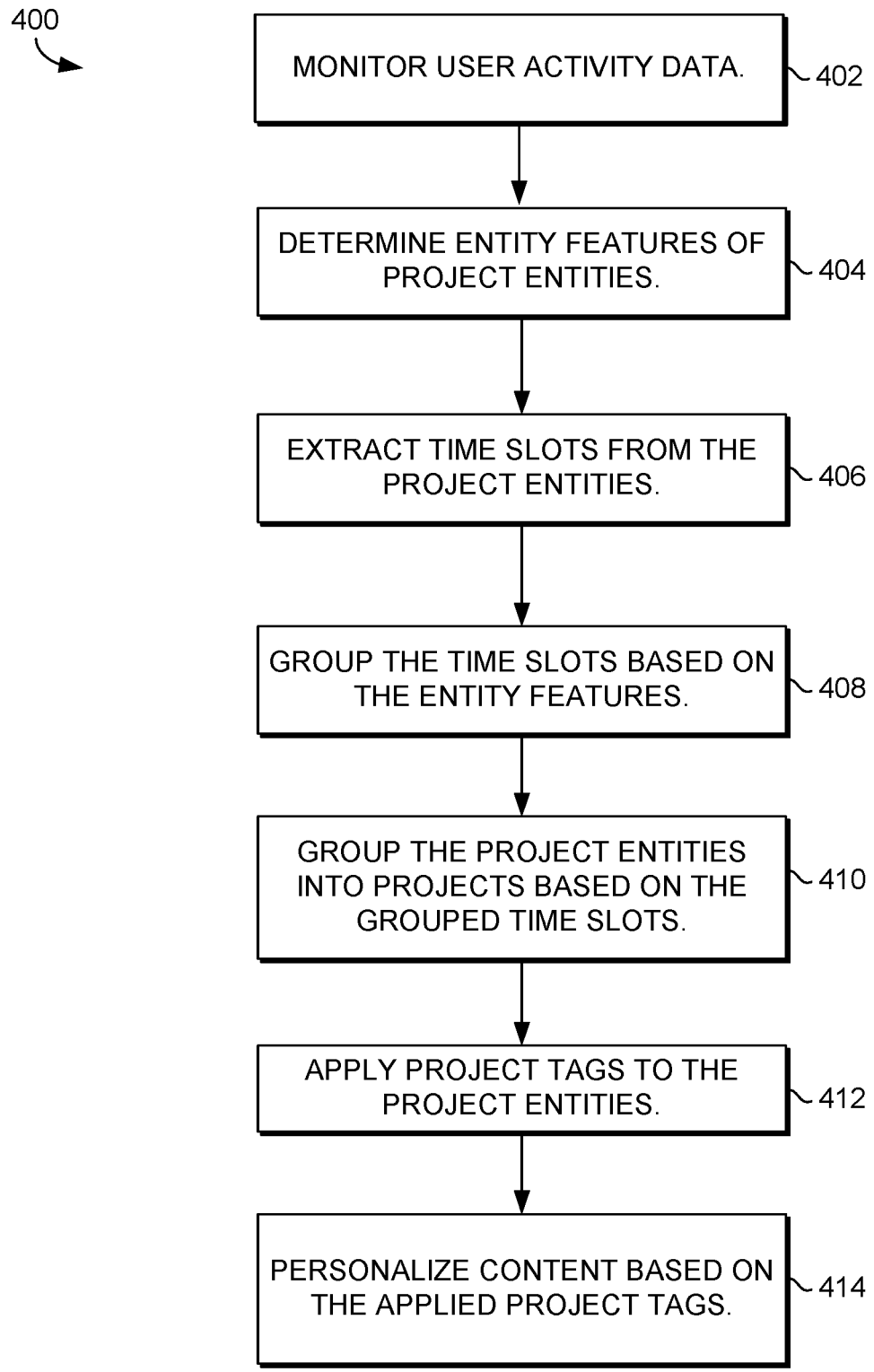
FIG. 4 is a flow diagram that illustrates a method determiner in accordance with embodiments of the present disclosure.

Turning now to FIG. 4, a flow diagram is provided that illustrates method 400 for associating project entities with projects. As shown at block 402, method 400 includes monitoring user activity data. For example, user activity monitor 280 can monitor user activity data based at least in part on sensor data from at least one user device associated with a user, such as user device 102*a*.

At block 404, method 400 includes determining entity features of the project entities. For example, entity feature identifier 285 can determine and identify from the user activity data entity features of project entities corresponding to the user activity data.

At block 406, method 400 includes extracting time slots from the project entities. For examples, user activity monitor 280 can extract time slots from the project entities, events, and other user activity data.

At block 408, method 400 includes grouping the time slots based on the entity features. For example, time slot grouper 352 can cluster the time slots into groups based on the entity features of one of the project entities corresponding to the time slots. In other words, a time slot may be grouped based on entity features of the project entities corresponding to the time slot.

At block 410, method 400 includes grouping the project entities into projects based on the grouped time slots. For example, project entity reclassifier 354 can group the project entities into project based on the clustered time slots. It will be appreciated that this step need not correspond to a reclassifying of project entities in some embodiments.

At block 412, method 400 includes applying project tags to the project entities. For example, project tagger 268 can apply project tags to the project entities based on the grouping of the project entities. This can include adding tags to project entities or updating project tags of project entities.

At block 414, method 400 includes personalizing content based on the applied project tags. For example, project interface manager 260 can personalize content to the user based on the project tagged applied to the project entities (e.g., using any of its various components or functionality described above). The personalized content can be presented on a user device using presentation component 220.

Figure 5:
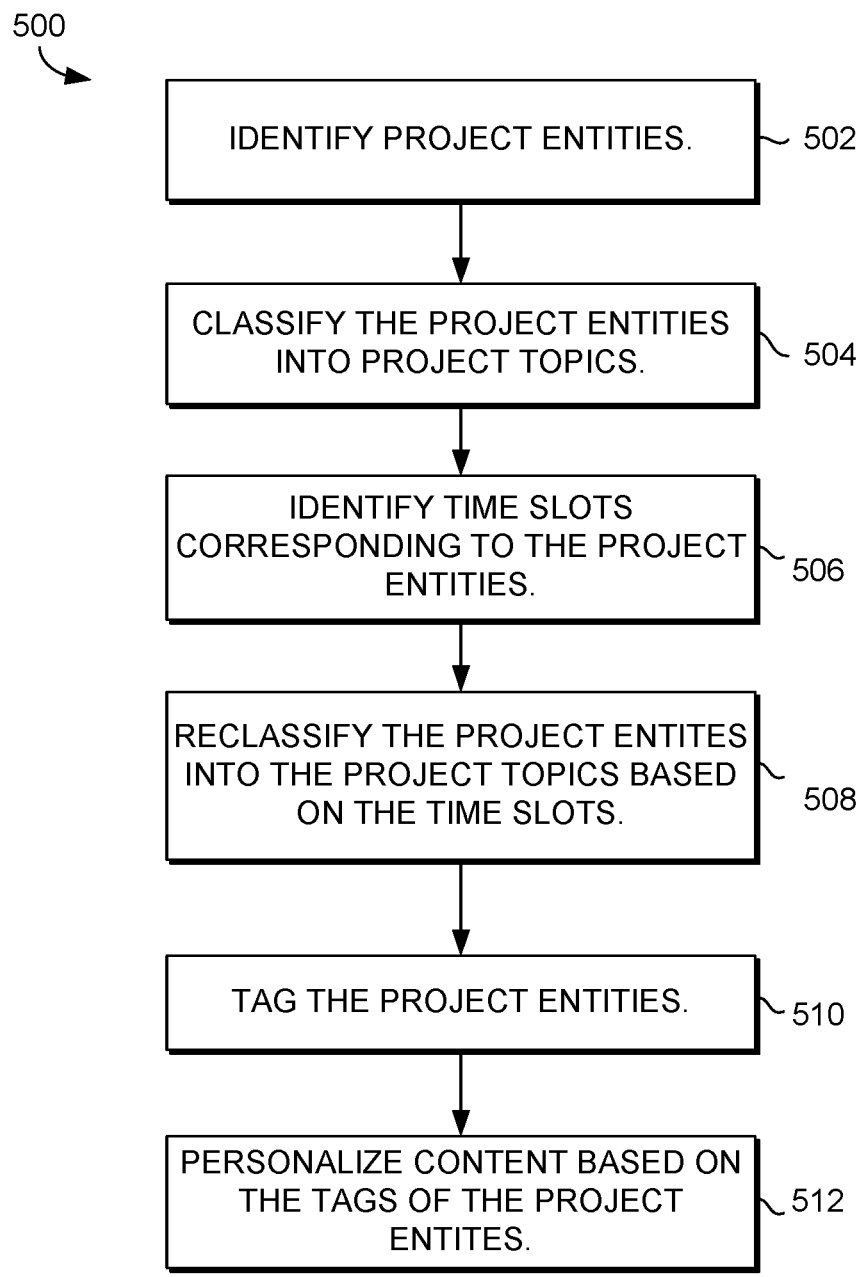
FIG. 5 is a flow diagram that illustrates a method determiner in accordance with embodiments of the present disclosure.

With reference to FIG. 5, a flow diagram is provided that illustrates method 500 for associating project entities with projects. At block 502, method 500 includes identifying project entities. For example, project entity identifier 282 can identify project entities based on user activity data corresponding to sensor data associated with the user.

At block 504, method 500 includes classifying the project entities into project topics. For example, project entity preclassifier 350 can extract topics from the project entities and associate the project entities with the project topics.

At block 506, method 500 includes identifying time slots corresponding to the project entities. For example, user activity monitor 280 can generate time slots from the project entities.

At block 508, method 500 includes reclassifying the project entities into the project topics based on the identified time slots. For example, project entity reclassifier 354 can reclassify the project entities into the project topics based on the time slots.

At block 510, method 500 includes tagging the project entities with project tags. For example, project tagger 268 can tag the project entities with project tags corresponding to the project topics based on the reclassifying.

At block 512, method 500 includes personalizing content based on the project tags. For example, project interface manager 260 can personalize content to the user based on the project tags tagged to the project entities (e.g., by utilizing any of its various components or functionality described herein). The personalized content can be transmitted to a user device and presented in association with the user, as one example.

It is understood that various features, sub-combinations, and modifications of the embodiments described herein are of utility and may be employed in other embodiments without reference to other features or sub-combinations. Moreover, the order and sequences of steps shown in the example methods 400 and 500 are not meant to limit the scope of the present invention, and in fact, the steps may occur in a variety of different sequences within embodiments hereof. Such variations and combinations thereof are also contemplated to be within the scope of embodiments of the invention.

Figure 6:
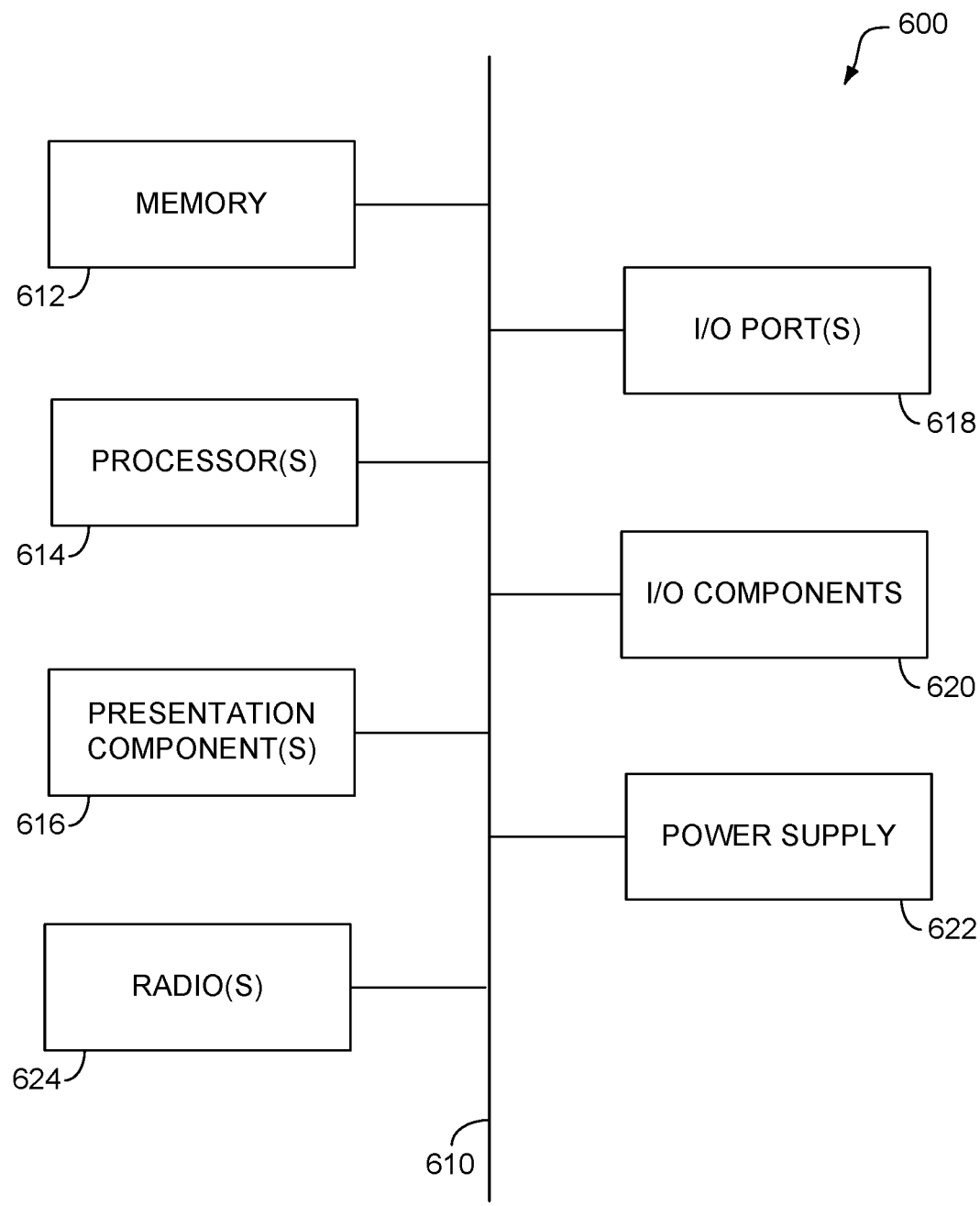
FIG. 6 is a block diagram that illustrates an example of a computing device in accordance with embodiments of the present disclosure.

Having described various embodiments of the invention, an example of a computing environment suitable for implementing embodiments of the invention is now described. With reference to FIG. 6, an example of a computing device is provided and referred to generally as computing device 600. The computing device 600 is but one example of a suitable computing environment and is not intended to suggest any limitation as to the scope of use or functionality of the invention. Neither should the computing device 600 be interpreted as having any dependency or requirement relating to any one or combination of components illustrated.

Embodiments of the invention may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the invention may be practiced in a variety of system configurations, including handheld devices, consumer electronics, general-purpose computers, more specialty computing devices, etc. Embodiments of the invention may also be practiced in distributed computing environments where tasks are performed by remote-processing devices that are linked through a communications network. In a distributed computing environment, program modules may be located in both local and remote computer storage media including memory storage devices.

With reference to FIG. 6, computing device 600 includes a bus 610 that directly or indirectly couples the following devices: memory 612, one or more processors 614, one or more presentation components 616, one or more input/output (I/O) ports 618, one or more I/O components 620, and an illustrative power supply 622. Bus 610 represents what may be one or more busses (such as an address bus, data bus, or combination thereof). Although the various blocks of FIG. 6 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 6 is merely illustrative of an example of a computing device that can be used in connection with one or more embodiments of the present invention. Distinction is not made between such categories as "workstation," "server," "laptop," "handheld device," etc., as all are contemplated within the scope of FIG. 6 and with reference to "computing device."

Computing device 600 typically includes a variety of computer-readable media. Computer-readable media can be any available media that can be accessed by computing device 600 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 612 includes computer storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors 614 that read data from various entities such as memory 612 or I/O components 620. Presentation component(s) 616 presents data indications to a user or other device. Exemplary presentation components include a display device, speaker, printing component, vibrating component, and the like.

The I/O ports 618 allow computing device 600 to be logically coupled to other devices, including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 600. The computing device 600 may be equipped with depth cameras, such as stereoscopic camera systems, infrared camera systems, RGB camera systems, and combinations of these, for gesture detection and recognition. Additionally, the computing device 600 may be equipped with accelerometers or gyroscopes that enable detection of motion. The output of the accelerometers or gyroscopes may be provided to the display of the computing device 600 to render immersive augmented reality or virtual reality.

Some embodiments of computing device 600 may include one or more radio(s) 624 (or similar wireless communication components). The radio 624 transmits and receives radio or wireless communications. The computing device 600 may be a wireless terminal adapted to receive communications and media over various wireless networks. Computing device 600 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the present invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility, may be employed without reference to other features and sub-combinations, and are contemplated within the scope of the claims.

What is claimed is:

1. A computer-implemented system comprising:
   a processor; and
   memory storing computer-useable instructions that, when executed by the processor, implement a method comprising:
     identifying activity data for project entities associated with a user, the project entities comprising at least one of: documents, events, or users;
     determining entity features of the project entities, the entity features identifying context information of the project entities;
     extracting a first set of keywords from the project entities;
     identifying similarities in the first set of keywords using machine learning, the similarities representing a first common topic among the first set of keywords;
     automatically assigning the first common topic to the project entities as a project topic of a first project;
     grouping the project entities by the project topic of the first project;
     extracting, from the entity features, time slots associated with the project entities, wherein each of the time slots define a start time and an end time;
     generating, using the time slots, time slot clusters based on the entity features, wherein each of the time slot clusters represent a period of user activity associated with a respective project entity;
     based on the time slot clusters, regrouping the project entities into regrouped project entities, wherein regrouping the project entities comprises changing at least one project entity from the project topic of the first project to a project topic of a second project, the project topic of the second project representing a second common topic among a second set of keywords from the regrouped project entities;
     applying, to the regrouped project entities, project tags corresponding to the second project; and
     personalizing content for the user based on the project tags applied to the regrouped project entities.

2. The system of claim 1, wherein personalizing the content comprises:
   determining a project pattern of the second project based on the entity features; and
   generating the personalized content from the project pattern.

3. The system of claim 1, wherein extracting the time slots comprises generating a time slot of the time slots based on a timestamp associated with an event inferred from the activity data.

4. The system of claim 1, wherein the project entities comprise emails, meetings, and contacts identified in association with an email application.

5. The system of claim 1, wherein the time slots are extracted from timestamps stored in association with data objects corresponding to the project entities, the timestamps corresponding to user interactions by the user with the data objects.

6. The system of claim 1, wherein grouping the project entities is further based on personal features of the user, the personal features corresponding to at least one historical project associated with the user.

7. The system of claim 1, wherein the personalizing content for the user comprises processing a search query against the project tags, wherein the personalized content corresponds to search results of the search query.

8. The system of claim 1, wherein the method further comprises:
   determining a project resolution for the second project based on a set of the project entities classified as one or more project topics; and
   analyzing the second project at the determined project resolution, wherein the personalized content is based on the analyzing of the second project.

9. The method of claim 1, wherein the personalizing content for the user comprises blocking one or more communications from being presented to the user based on a comparison between the one or more communications and project features of the project.

10. A computer-implemented method comprising:
   identifying user activity data for project entities associated with a user, wherein the user activity data is collected from one or more devices and the project entities comprise at least one of: documents, events, or users;
   determining entity features of the project entities, the entity features identifying context information of the project entities;
   extracting a first set of keywords from the project entities;
   identifying similarities in the first set of keywords using machine learning, the similarities representing a first common topic among the first set of keywords;
   assigning the first common topic to the project entities as a first project topic;
   classifying the project entities according to the first project topic using one or more classification algorithms;
   identifying time slots corresponding to the classified project entities, wherein each of the time slots define a start time and an end time;
   generating, using the time slots, time slot clusters based on the entity features, wherein each of the time slot clusters represent a period of user activity associated with a respective project entity;
   based on the time slot clusters, reclassifying the project entities into a second project topic using the one or more classification algorithms, the second project topic representing a second common topic among a second set of keywords from the project entities;
   tagging the project entities with project tags corresponding to the second project topic based on the reclassifying; and
   personalizing content for a user based on the project tags of the project entities.

11. The method of claim 10, further comprising determining an importance score for a project based on the project entities, wherein the personalized content is based on the importance score.

12. The method of claim 10, wherein the classifying the project entities according to the first project topic comprises:
   generating a hierarchical project topic model from the first set of keywords, wherein the project entities are classified into the hierarchical project topic model.

13. The method of claim 10, wherein the project entities are classified according to the first project topic based on time-related features and place-related features of the project entities.

14. The method of claim 10, further comprising determining for each project entity, a set of users associated with the project entity, wherein the project entities are classified based on similarities in the set of users amongst the project entities.

15. The method of claim 10, further comprising determining for each project entity, a set of project entities explicitly referenced in a data object corresponding to the project entity, wherein the project entities are classified based on similarities in a set of references amongst the project entities.

16. One or more computer storage media storing computer-useable instructions that, when used by one or more computing devices, cause the one or more computing devices to perform a method comprising:
   monitoring user activity data based at least in part on sensor data from at least one user device associated with a user;
   determining, from the monitored user activity data, entity features of project entities corresponding to the user activity data, wherein:
      the project entities comprising at least one of: documents, events, or users; and
      the entity features identify context information of the project entities;
   extracting a first set of keywords from the project entities;
   identifying similarities in the first set of keywords using machine learning, the similarities representing a first common topic among the first set of keywords;
   assigning the first common topic to the project entities as a first project topic;
   grouping the project entities by the first project topic using one or more grouping algorithms;
   extracting, from the entity features, time slots associated with the project entities;
   generating, using the time slots, time slot clusters based on the entity features, wherein each of the time slot clusters represent a period of user activity associated with a respective project entity;
   based on the time slot clusters, regrouping the project entities into regrouped project entities using the one or more grouping algorithms, wherein regrouping the project entities comprises changing at least one project entity from the first project topic to a second project topic, the second project topic representing a second common topic among a second set of keywords from the regrouped project entities;

applying, to the regrouped project entities, project tags corresponding to a project associated with the second project topic; and processing a search against a subset of the regrouped project entities based on the project tags applied to the subset of the regrouped project entities.

17. The one or more computer storage media of claim 16, wherein the subset of project entities is determined based on one or more project resolutions associated with the project entities.

18. The one or more computer storage media of claim 16, wherein the method further comprises determining a project resolution for the project based on the project entities, wherein the search is based on the project and the subset of regrouped project entities is based on the determined project resolution.

19. The one or more computer storage media of claim 16, wherein the time slots are extracted from timestamps stored in association with data objects corresponding to the project entities, the timestamps corresponding to user interactions by the user with the data objects.

20. The one or more computer storage media of claim 16, wherein the method further comprises determining for each project entity, a set of users associated with the project entity, wherein the project entities are classified based on similarities in the set of users amongst the project entities.

* * * * *